United States Patent
Wurden

(10) Patent No.: US 12,105,528 B2
(45) Date of Patent: Oct. 1, 2024

(54) WALKING VTOL DRONE AND RELATED SYSTEMS AND METHODS

(71) Applicant: Aigen, Inc., Seattle, WA (US)

(72) Inventor: Richard Wurden, Seattle, WA (US)

(73) Assignee: Aigen, Inc., Seattle, WA (US)

( * ) Notice: Subject to any disclaimer, the term of this patent is extended or adjusted under 35 U.S.C. 154(b) by 0 days.

(21) Appl. No.: 17/728,760

(22) Filed: Apr. 25, 2022

(65) Prior Publication Data

US 2022/0339983 A1 Oct. 27, 2022

Related U.S. Application Data

(60) Provisional application No. 63/179,708, filed on Apr. 26, 2021.

(51) Int. Cl.
*G05D 1/00* (2024.01)
*B60L 8/00* (2006.01)
(Continued)

(52) U.S. Cl.
CPC ............ *G05D 1/0858* (2013.01); *B60L 8/003* (2013.01); *B62D 57/032* (2013.01); *B64C 1/22* (2013.01);
(Continued)

(58) Field of Classification Search
CPC ... B64C 29/0025; B64C 1/22; B64C 29/0016; B64U 60/55; B64U 60/70;
(Continued)

(56) References Cited

U.S. PATENT DOCUMENTS 3,552,587 A 1/1971 Warren
10,676,177 B1 * 6/2020 Costello ............... B64C 25/001
(Continued)

FOREIGN PATENT DOCUMENTS

CN 104554706 2/2017
CN 109263876 1/2019
(Continued)

OTHER PUBLICATIONS

International Search Report and Written Opinion for International Patent Application No. PCT/US22/26188, Applicant: Aigen, Inc., mailed Jan. 30, 2023, 12 pages.
(Continued)

*Primary Examiner* — Timothy D Collins
*Assistant Examiner* — Justin Michael Heston
(74) *Attorney, Agent, or Firm* — Perkins Coie LLP

(57) ABSTRACT

Walking VTOL vehicles and related systems and methods are disclosed. A representative system can include one or more vertical thrust propulsion systems for providing vertical thrust for the vehicle, one or more horizontal thrust propulsion systems for providing horizontal thrust for the vehicle, and leg elements that are rotatable between a first configuration in which each leg element extends downwardly and a second configuration different from the first configuration. A representative method of operating a vehicle includes using vertical thrust to raise the vehicle upward, rotating a leg element forward, lowering the vehicle, and then rotating the leg element rearward to propel the vehicle forward.

29 Claims, 16 Drawing Sheets

(51) Int. Cl.

| | | |
|---|---|---|
| *B62D 57/032* | (2006.01) | |
| *B64C 1/22* | (2006.01) | |
| *B64C 25/00* | (2006.01) | |
| *B64C 29/00* | (2006.01) | |
| *B64D 1/22* | (2006.01) | |
| *B64D 9/00* | (2006.01) | |
| *B64U 10/20* | (2023.01) | |
| *B64U 10/70* | (2023.01) | |
| *B64U 60/40* | (2023.01) | |
| *B64U 60/55* | (2023.01) | |
| *B64U 101/60* | (2023.01) | |

(52) U.S. Cl.
CPC ........ *B64C 25/001* (2013.01); *B64C 29/0016* (2013.01); *B64D 1/22* (2013.01); *B64D 9/00* (2013.01); *B64U 10/20* (2023.01); *B64U 10/70* (2023.01); *B64U 60/40* (2023.01); *B64U 60/55* (2023.01); *B60L 2200/10* (2013.01); *B64U 2101/60* (2023.01)

(58) Field of Classification Search
CPC ............ B64U 2101/60; B64U 2101/64; B64U 2101/66; B64U 2101/67
See application file for complete search history.

(56) References Cited

U.S. PATENT DOCUMENTS

| | | | |
|---|---|---|---|
| 11,124,292 B2 * | 9/2021 | Chen | B64C 37/00 |
| 2005/0269441 A1 | 12/2005 | Barocela | |
| 2008/0283673 A1 | 11/2008 | Yoeli | |
| 2010/0012769 A1 * | 1/2010 | Alber | B64C 39/024 |
| | | | 244/17.23 |
| 2014/0151502 A1 * | 6/2014 | Kosheleff | B64F 1/007 |
| | | | 244/114 R |
| 2015/0336666 A1 * | 11/2015 | Paduano | B64C 39/024 |
| | | | 244/12.4 |
| 2016/0159468 A1 | 6/2016 | Harris | |
| 2017/0315562 A1 | 11/2017 | Wang | |
| 2017/0320570 A1 * | 11/2017 | Horn | B64U 10/20 |
| 2019/0061968 A1 | 2/2019 | Tian | |
| 2020/0180761 A1 * | 6/2020 | Sloan | B64U 30/10 |
| 2022/0339983 A1 | 10/2022 | Wurden | |
| 2023/0331408 A1 | 10/2023 | Wurden | |

FOREIGN PATENT DOCUMENTS

| | | |
|---|---|---|
| KR | 101828924 B1 * | 2/2018 |
| RU | 26577096 | 6/2018 |
| WO | 2001058756 | 8/2001 |
| WO | 20210236753 | 11/2021 |

OTHER PUBLICATIONS

WintraOne Gen II, Map larger, map faster, map anywhere, https://wingtra.com/mapping-drone-wingtraone/, publication date unknown, 32 pages.

Urban Air Mobility News.com, "Solar powered drone will help combat terrorism in Cameroon," https://www.urbanairmobilitynews.com/security-and-law-enforcement/solar-powered-drone-will-help-combat-terrorism-in-cameroon/, Aug. 12, 2019, 6 pages.

Designboom, "Leonardo: The Skateboarding, Slacklining Robot," https://www.designboom.com/technology/leonardo-fusion-bipedal-walking-robot-flying-drone-slackline-Oct. 7, 2021/, Oct. 7, 2021, 6 pages.

* cited by examiner

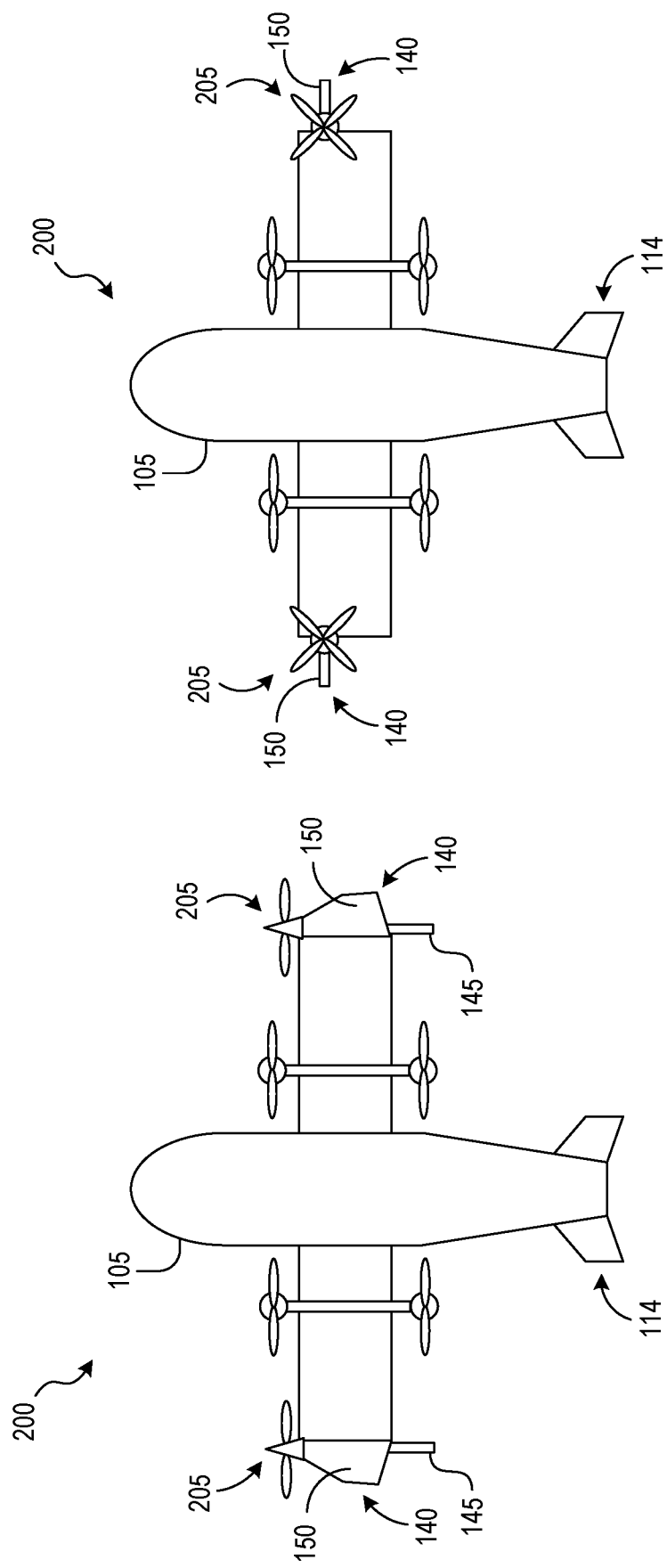

WALKING VTOL DRONE AND RELATED SYSTEMS AND METHODS

CROSS-REFERENCE TO RELATED APPLICATION(S)

The present application claims priority to U.S. Provisional Patent Application No. 63/179,708, filed Apr. 26, 2021, which is incorporated herein by reference in its entirety.

TECHNICAL FIELD

The present disclosure is directed generally to aircraft, such as uncrewed aerial vehicles (e.g., "drones"). Representative features of the present disclosure include aircraft capable of ambulation along the ground, aircraft with solar energy sources, and/or aircraft with cargo carrying systems.

BACKGROUND

An advantage of vertical take-off and landing (VTOL) aircraft is that such vehicles can land almost anywhere. For example, VTOL aircraft do not require runways. This is advantageous in combat, surveillance, rescue situations, and/or commercial applications.

Some VTOL aircraft use electric power sources (e.g., batteries and electric motors). Electric aircraft can be more energy efficient than fuel-based vehicles and may also output less noise and pollution than their fuel-based counterparts. However, conventional VTOL aircraft that use electric power sources need to be charged, and charging infrastructure is often centrally-located and/or immobile. As a result, a VTOL aircraft's usable range may be limited by locations of charging infrastructure.

Conventional aircraft, including conventional VTOL aircraft, do not have optimal structure for loading, unloading, and/or carrying cargo. For example, conventional VTOL aircraft may require a dedicated loading platform, which further reduces the conventional VTOL aircraft's useable range to areas that have infrastructure for loading and/or unloading. Conventional uncrewed VTOL aircraft may expose cargo to the elements and/or to aerodynamic forces during flight of the conventional aircraft, which reduces efficiency and risks damage to the cargo.

Conventional aircraft also suffer from a lack of mobility while on the ground. Some conventional aircraft have wheels, skis, and/or skids, but existing apparatuses for mobility are limited to operation on level and/or smooth terrain, which further limits the aircraft's ability to load and/or unload cargo in a desired location, and/or to traverse remote areas.

Embodiments of the present technology are directed to addressing these challenges and other challenges.

BRIEF DESCRIPTION OF THE DRAWINGS

In the drawings, wherein the same reference number indicates the same element throughout the views:

FIG. 2A illustrates a partially schematic top view of a vertical take-off and landing (VTOL) vehicle (aircraft), configured in accordance with embodiments of the present technology.

FIG. 2B illustrates a partially schematic top view of the vehicle shown in FIG. 2A, in which landing gear assemblies are in a first configuration (leg elements of the landing gear assemblies extend downwardly, away from the viewer's perspective in FIG. 2B).

FIG. 5A illustrates a partially schematic front view of the vehicle in which the aerodynamic covers are open and allow operation of the vertical thrust propulsion systems. FIG. 5B illustrates a partially schematic side view of the vehicle shown in FIG. 5A. FIG. 5C illustrates a partially schematic front view of the vehicle in which the aerodynamic covers cover the vertical thrust propulsion systems. FIG. 5D illustrates a partially schematic side view of the vehicle shown in FIG. 5C.

FIG. 6A is a side view, FIG. 6B is a front view (looking toward a nose portion of an aircraft), and FIG. 6C is a top view.

DETAILED DESCRIPTION

Figure 1B:
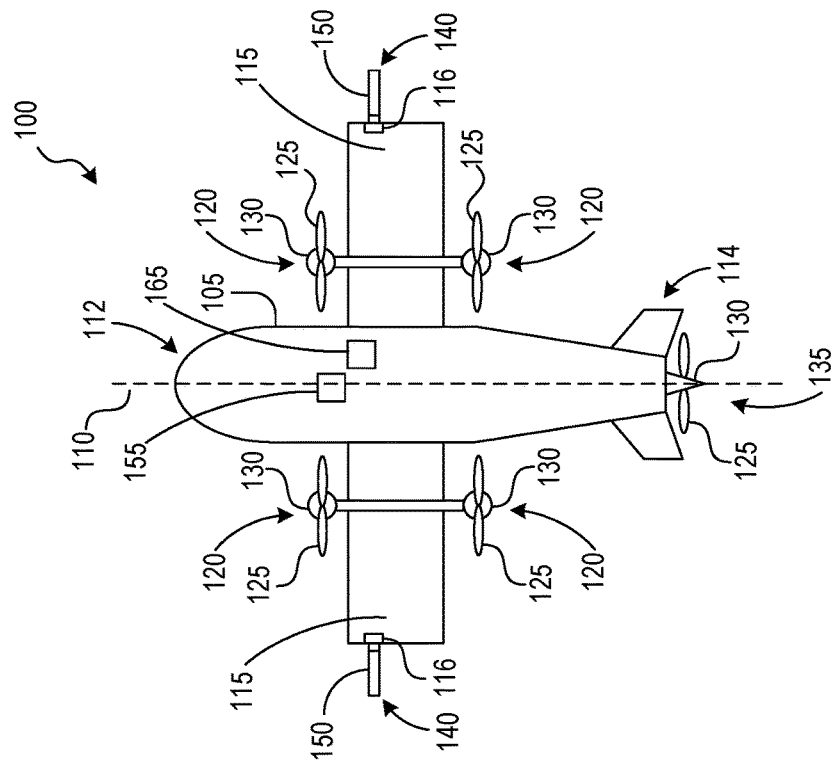
FIG. 1B illustrates a partially schematic top view of the vehicle shown in FIG. 1A, in which the vehicle has rotated its landing gear assemblies.

Embodiments of the technology disclosed herein are directed generally to uncrewed VTOL aircraft, but the present technology can also be implemented in other aircraft systems or other vehicles.

Embodiments of the present technology include solar-charged, electric VTOL aircraft that are capable of long-range flights for delivering cargo, for performing surveillance, and/or for other activities. The aircraft can maneuver/ambulate on the ground ("walk") to optimize charging on the ground and/or for cargo loading. Embodiments of the present technology also include networks of VTOL aircraft that charge in flight and/or on the ground to reduce (e.g., eliminate) a need for charging infrastructure, which can facilitate methods of cargo transportation that do not require frequent returns to a central distribution center. Accordingly, embodiments of the present technology provide decentralized delivery methods. Instead of requiring centralized charging and/or cargo loading/unloading stations, aircraft configured in accordance with embodiments of the present technology can carry their own charging systems and/or their own cargo handling systems.

A representative system includes a vertical take-off and landing vehicle having a fuselage extending along a longitudinal axis, one or more wings connected to the fuselage, a propeller positioned to provide thrust for the vehicle along a vertical direction transverse to the longitudinal axis, and a landing gear assembly comprising a leg element extending from an aerodynamic control surface. The landing gear assembly can rotate between a first configuration in which the leg element extends downwardly (e.g., to support the vehicle on a surface such as the ground) and a second configuration different from the first configuration (e.g., to align the leg element along the fuselage when the vehicle is in forward horizontal flight). A plurality of landing gear assemblies enable the vehicle to walk along the surface.

Another representative system includes a vertical take-off and landing vehicle having a fuselage, one or more wings connected to the fuselage, one or more vertical thrust propulsion systems carried by the vehicle and positioned to provide vertical thrust for the vehicle, one or more horizontal thrust propulsion systems carried by the vehicle and positioned to provide horizontal thrust for the vehicle, a plurality of leg elements rotatable between a first configuration in which each leg element extends downwardly and a second configuration different from the first configuration, and a controller programmed with instructions that, when executed: operate the one or more vertical thrust propulsion systems to lift a first leg element of the plurality of leg elements off of a surface, cause the first leg element to rotate along a first direction; operate the one or more vertical thrust propulsion systems to lower the first leg element back on to the surface, and cause the first leg element to rotate along a second direction that is opposite the first direction, to propel the vehicle along the surface.

A representative method of operating a vertical take-off and landing vehicle includes operating one or more vertical thrust propulsion systems to raise a first portion of the vehicle upward, rotating a first leg element along a first direction (e.g., forward toward the nose of the aircraft), operating the vertical thrust propulsion system(s) to lower the first portion of the vehicle to allow the first leg element to contact a surface, rotating the first leg element along a second direction opposite the first direction (e.g., rearward toward the tail of the aircraft) to cause the vehicle to move along the surface, operating the one or more vertical thrust propulsion systems to raise a second portion of the vehicle upward, rotating a second leg element along the first direction, operating the vertical thrust propulsion system(s) to lower the second portion of the vehicle to allow the second leg element to contact the surface, and rotating the second leg element along the second direction to cause the vehicle to move along the surface.

In some embodiments, vehicles can walk to position and/or orient themselves toward a light source (such as the sun), and/or to locate and retrieve and/or drop-off cargo.

Walking VTOL Drones

Several embodiments of the present technology include aerospace vehicles (aircraft, including "drones") capable of walking on the ground using leg elements. Representative embodiments of vehicles are described herein. Representative methods of walking and maneuvering on the ground are also described herein.

Figure 1A:
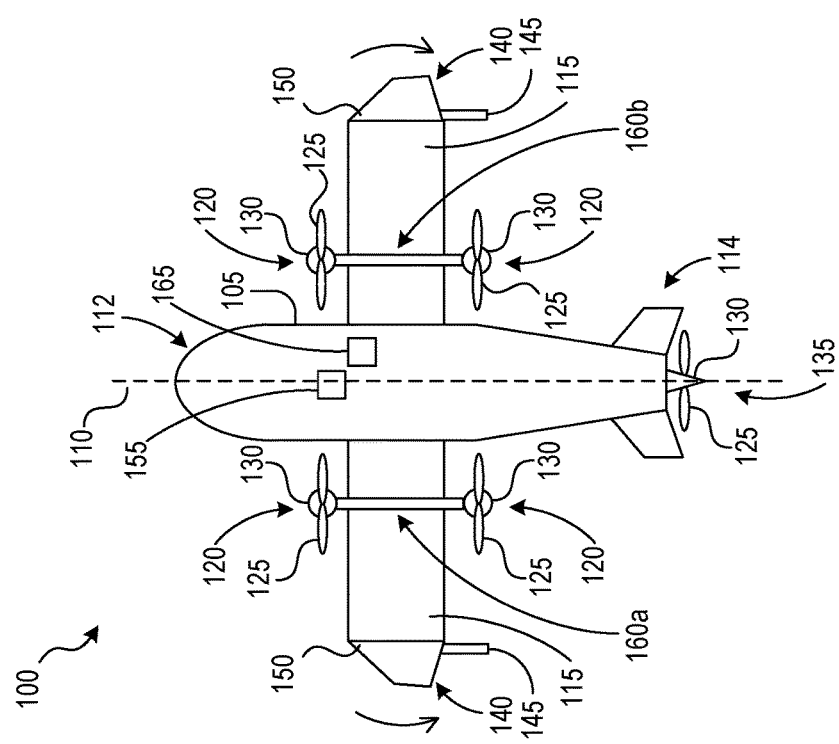
FIG. 1A illustrates a partially schematic top view of a vertical take-off and landing (VTOL) vehicle (e.g., an aircraft), configured in accordance with embodiments of the present technology.

FIG. 1A illustrates a partially schematic top view of a vertical take-off and landing (VTOL) vehicle (aircraft) 100, configured in accordance with some embodiments of the present technology. The vehicle 100 can include a fuselage 105 extending along a longitudinal axis 110 between a nose portion 112 and a tail portion 114. In a generally horizontal flight direction, the nose portion 112 leads the tail portion 114. The vehicle 100 can further include one or more wings 115 connected to (e.g., carried by) the fuselage 105.

The vehicle 100 can include one or more propulsion systems for providing thrust to the vehicle. For example, in some embodiments, the vehicle 100 can include one or more (such as two or more, four, or another suitable number) vertical thrust propulsion systems 120, which can include propellers 125 driven by suitable motors 130. The vertical thrust propulsion systems 120 can be positioned to provide thrust for the vehicle 100 along a vertical flight direction that is transverse to the longitudinal axis 110 and/or transverse to the horizontal flight direction, to lift the vehicle 100 to become airborne. In some embodiments, the vehicle 100 can further include one or more horizontal thrust propulsion systems 135 positioned to provide thrust for the vehicle 100 along a horizontal flight direction, to propel the vehicle forward (e.g., horizontally) while airborne. A pusher system at the tail portion 114 is shown, but a puller system may additionally or alternatively be implemented at the nose portion 112 and/or at another location on the vehicle 100). Each horizontal thrust propulsion system 135 can also include a propeller 125 driven by a suitable motor 130.

In some embodiments, the motors 130 can include electric motors, although the technology is not limited to electrically-driven propulsion (e.g., the motors 130 can include internal combustion engines). In some embodiments, the vertical thrust propulsion systems 120 and/or the horizontal thrust propulsion system(s) 135 can include jet propulsion systems and/or other systems suitable for providing vertical thrust.

The vehicle 100 can include one or more landing gear assemblies 140. In some embodiments, each landing gear assembly 140 can include a leg element 145 and an aerodynamic control surface 150 that carries the leg element 145. The leg element 145 extends from the aerodynamic control surface 150. The landing gear assemblies 140 are rotatable such that each leg element 145 rotates with its corresponding aerodynamic control surface 150. The aerodynamic control surfaces 150 can include ailerons, elevators, and/or other suitable aerodynamic control surfaces, and they can operate during horizontal flight to assist with controlling the aircraft. Accordingly, in some embodiments, the landing gear assemblies 140 can control vehicle roll about the longitudinal axis 110, rotation about a vertical axis perpendicular to the longitudinal axis 110, and vehicle pitch (e.g., angle of attack). The landing gear assemblies 140 can also act as landing gear for contacting the ground during landing and/or takeoff.

FIG. 1B illustrates a partially schematic top view of the vehicle 100, in which the landing gear assemblies 140 have been rotated relative to the remainder of the wing(s) 115 and/or relative to the fuselage 105. The vehicle 100 can include one or more motors 116 for rotating the landing gear assemblies 140. Each landing gear assembly 140 is rotatable between a first configuration (which may be called a "ground configuration" or a "take off position") in which the leg element 145 extends downwardly (illustrated generally in FIG. 1B), and a second configuration that is different from the first configuration. In the first configuration, the leg element 145 forms a support for supporting the vehicle 100 on a surface (e.g., the ground or another suitable surface) for vertical takeoff or landing operations. For example, in the first configuration, the leg element 145 can be oriented transverse (e.g., perpendicular) to the wings 115. In an example second configuration, the leg element 145 can extend along and beside the fuselage 105 (as generally illustrated in FIG. 1A). In some embodiments, in the second configuration, the leg element 145 can extend rearwardly (toward the tail portion 114) for aerodynamic efficiency during horizontal flight (i.e., the leg element 145 can extend along the airstream direction in a "long range position"). The vehicle 100 can fly horizontally and/or vertically regardless of the position or configuration of the leg elements 145. In some embodiments, the landing gear assemblies 140 can be attached to the one or more wings 115 and rotatable relative to the one or more wings 115. In other embodiments, the landing gear assemblies 140 can be attached to other parts of the vehicle 100.

With continuing reference to FIGS. 1A and 1B, vehicles configured in accordance with embodiments of the present technology (such as the vehicle 100) can include one or more batteries 155 for providing power to the propulsion systems 120. In some embodiments, separate powertrains 160A and 160B can individually power sets of propulsion systems 120 on opposing sides of the vehicle 100, which can provide redundancy in the event of failure of a powertrain 160A, 160B and/or a propulsion system 120. In some embodiments, each powertrain 160A, 160B can be connected to the horizontal thrust propulsion system 135 for providing redundant power to the horizontal thrust propulsion system 135 and to assist with long range horizontal flight. In some embodiments, each propulsion system 120, 135 can have its own powertrain. Vehicles configured in accordance with embodiments of the present technology (such as the vehicle 100) can further include one or more controllers 165 for sending and/or receiving communications, and/or for controlling operation of the propulsion systems 120, 135, the landing gear assemblies 140, and/or other aspects of the vehicle 100. The controller(s) 165 can be programmed with instructions that, when executed, carry out sequences or methods described below.

FIG. 2A illustrates a partially schematic top view of a vertical take-off and landing (VTOL) vehicle (aircraft) 200, configured in accordance with embodiments of the present technology. The vehicle 200 can be generally similar to the vehicle 100 described above with regard to FIGS. 1A and 1B (i.e., the vehicle 200 can include features of the vehicle 100), except that instead of (or in addition to) a horizontal thrust propulsion system 135 attached to a tail portion 114, the vehicle 200 can include one or more propulsion systems 205 attached to the landing gear assemblies 140. The propulsion systems 205 can rotate with the landing gear assemblies 140 to control the direction of thrust. In FIG. 2A, the landing gear assemblies 140 are configured for horizontal flight, as the leg elements 145 are positioned along the direction of flight (similar to FIG. 1A). FIG. 2B illustrates a partially schematic top view of the vehicle 200 in which the landing gear assemblies 140 are in the first configuration described above with regard to FIG. 1B (i.e., the leg elements 145 extend downwardly).

Figure 3A:
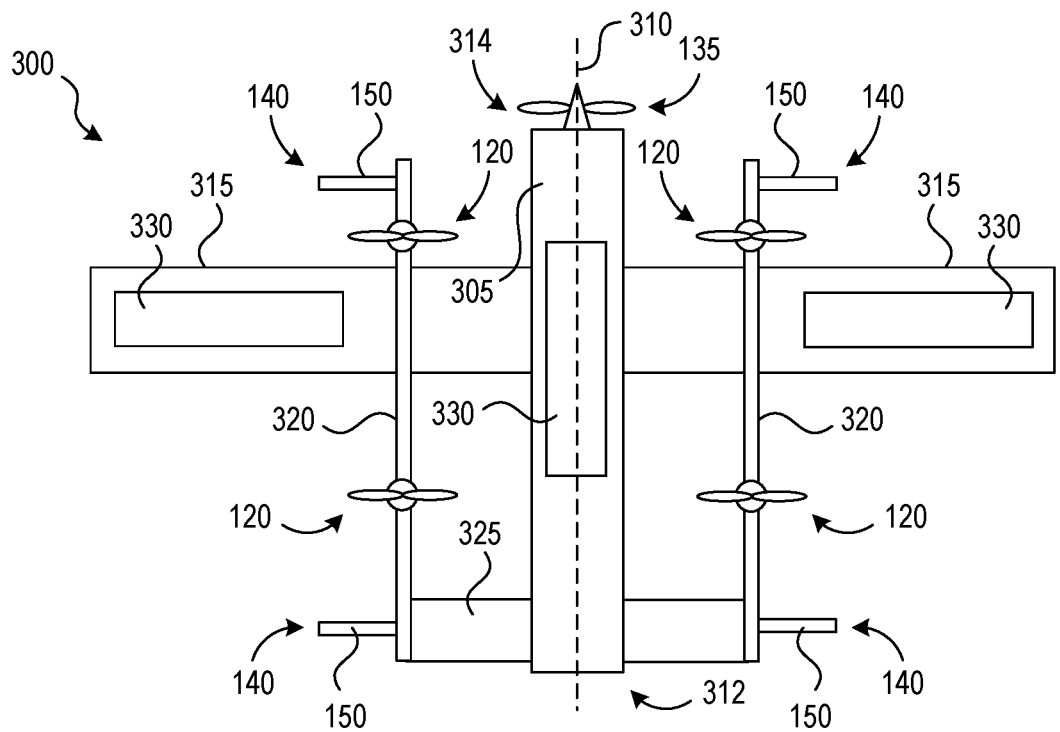
FIG. 3A illustrates a partially schematic top view of a vertical take-off and landing (VTOL) vehicle (aircraft), configured in accordance with embodiments of the present technology.

FIG. 3A illustrates a partially schematic top view of a vertical take-off and landing (VTOL) vehicle (aircraft) 300, configured in accordance with embodiments of the present technology. The vehicle 300 can include a fuselage 305 extending along a longitudinal axis 310 between a nose portion 312 and a tail portion 314. In a generally horizontal flight direction, the nose portion 312 leads the tail portion 314. The vehicle 300 can further include one or more wings 315 connected to (e.g., carried by) the fuselage 305. The vehicle 300 can include one or more propulsion systems for providing thrust to the vehicle 300. For example, in some embodiments, the vehicle 300 can include one or more (such as two or more, e.g., four) vertical thrust propulsion systems 120 (described above with regard to FIGS. 1A-2B). In some embodiments, the vehicle 300 can further include one or more horizontal thrust propulsion systems 135 (described above with regard to FIGS. 1A-2B) in any suitable location, such as the tail portion 314 (e.g., a pusher prop) and/or the nose portion 312 (e.g., a puller prop). Accordingly, the vehicle 300 can be generally similar to (i.e., include features of) the vehicles described above with regard to FIGS. 1A-2B, except that the vehicle 300 can include outriggers 320 positioned on opposing sides of the fuselage 305. The outriggers 320 can carry the propulsion systems 120. The outriggers 320 can be connected to the wings 315. The vehicle 300 can further include a forward surface or forewing 325 attached toward the nose portion 312 of the fuselage 305. The forewing 325 can span between (e.g., connect) the outriggers 320 to each another.

Figure 3B:
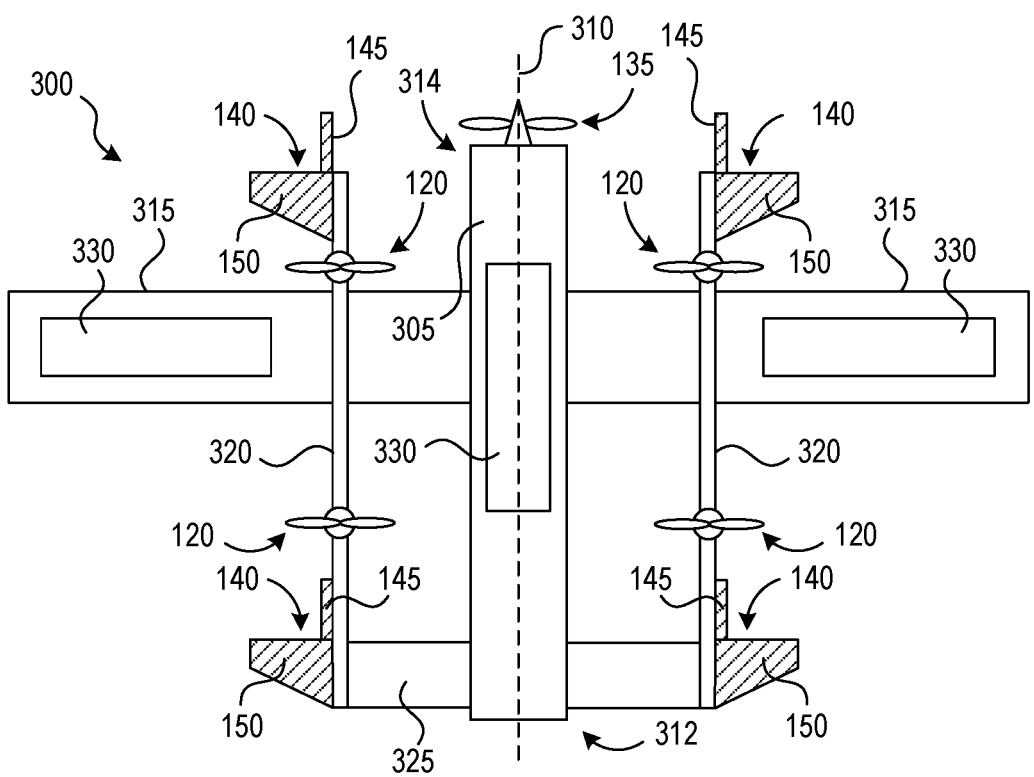
FIG. 3B illustrates a partially schematic top view of the vehicle shown in FIG. 3A, in which landing gear assemblies are in a second configuration (leg elements extend rearwardly toward a tail of the vehicle).

The vehicle 300 can further include one or more (e.g., two, four, or another suitable number) of the landing gear assemblies 140 described above with regard to FIGS. 1A-2B. In some embodiments, the landing gear assemblies 140 are carried on the outriggers 320. For example, each aerodynamic control surface 150 can extend laterally away from a corresponding outrigger 320 carrying the aerodynamic control surface 150. In other embodiments, the landing gear assemblies 140 are carried on the wings 315 in a similar manner as shown and described above with regard to FIGS. 1A-2B. FIG. 3A illustrates the landing gear assemblies 140 in the first (ground) configuration, in which the leg elements 145 extend downwardly (such that they are not visible in FIG. 3A). FIG. 3B illustrates a partially schematic top view of the vehicle 300, in which the landing gear assemblies 140 are in the second configuration (e.g., the leg element 145 extends rearwardly).

Any embodiments of vehicles disclosed herein can include one or more solar panels 330 positioned on any suitable surface for receiving solar energy and converting the solar energy to electrical energy to charge the batteries 155 (see FIG. 1A), to power the propulsion systems 120, to power cooling systems, to power communications systems, and/or for other aspects of vehicle operation. For example, in some embodiments, the solar panels 330 can be positioned on the fuselage (e.g., the fuselages 105, 305 described above) and/or on the wings (e.g., wings 115, 315 described above). In several embodiments, the propellers do not obstruct the solar panels 330.

Figure 4B:
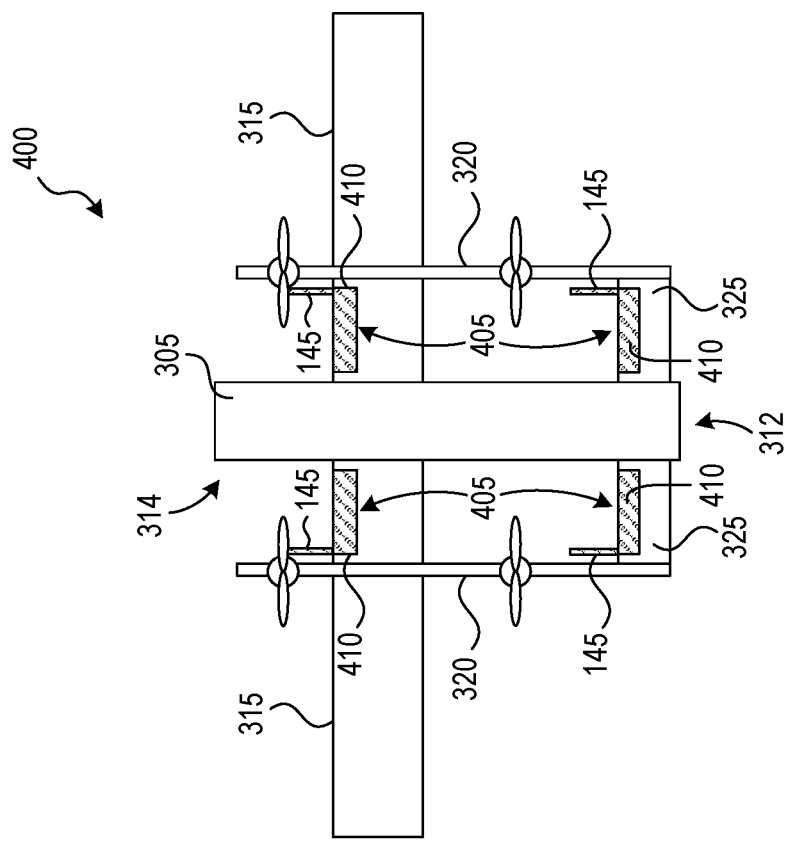
FIG. 4B illustrates a partially schematic top view of the vehicle shown in FIG. 4A, in which landing gear assemblies are in a second configuration (leg elements extend rearwardly toward a tail of the vehicle).
Figure 4A:
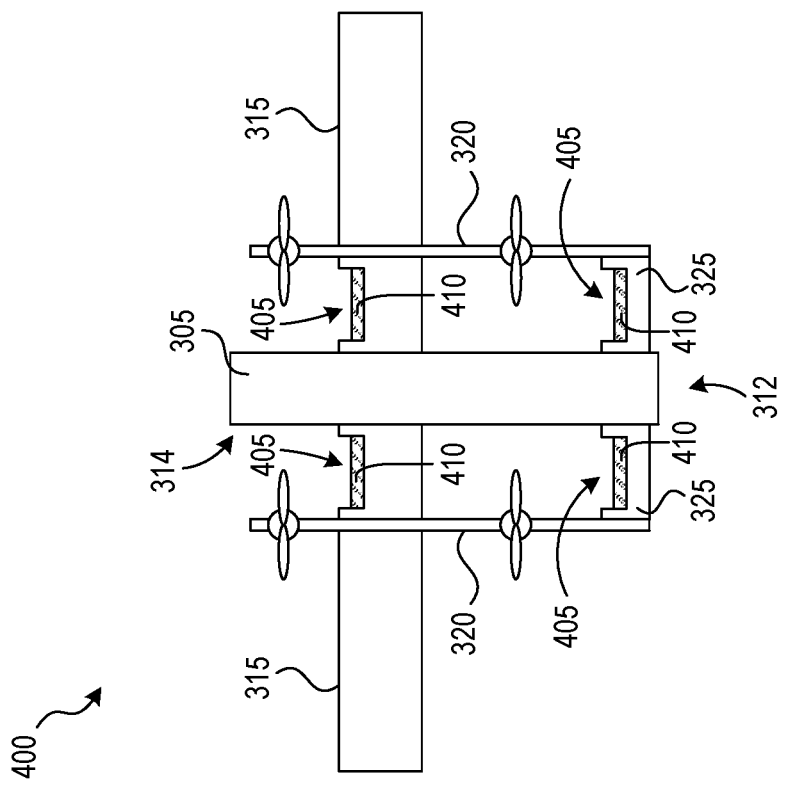
FIG. 4A illustrates a partially schematic top view of a vertical take-off and landing (VTOL) vehicle (aircraft) configured in accordance with embodiments of the present technology.

FIGS. 4A and 4B illustrate partially schematic top views of a vehicle 400 configured in accordance with embodiments of the present technology. The vehicle 400 is generally similar to the vehicle 300 described above with regard to FIGS. 3A and 3B (e.g., the vehicle 400 can include features of the vehicle 300), except that instead of having landing gear assemblies 140 extending from the outriggers 320, the vehicle 400 can include landing gear assemblies 405 that include trailing edge control surfaces 410 positioned on trailing edges of the wings 315 and/or the forewing 325. Horizontal thrust propulsion systems are not shown in FIGS. 4A and 4B, but any suitable horizontal thrust propulsion system can be included, such as one or more puller and/or pusher props as illustrated in connection with other embodiments disclosed herein. FIG. 4A shows the landing gear assemblies 405 in the first (ground) configuration, in which the leg elements 145 extend downwardly (such that they are not visible in FIG. 4A). FIG. 4B shows the landing gear assemblies 405 in the second configuration (e.g., the leg element 145 extends rearwardly for efficient horizontal flight).

When vehicles configured in accordance with embodiments of the present technology (e.g., vehicles 200, 300, 400 described above, and others described herein) are moving along a horizontal flight path, the vertical thrust propulsion systems 120 may create drag. Accordingly, in some embodiments, vehicles can include aerodynamic covers for the vertical thrust propulsion systems 120.

Figure 5A:
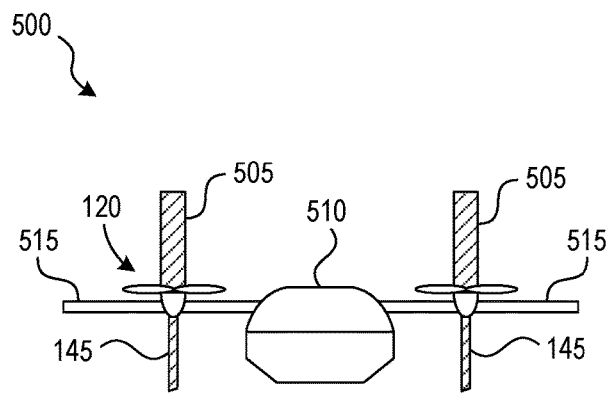
FIGS. 5A, 5B, 5C, and 5D illustrate partially schematic views of a vehicle with aerodynamic covers to cover vertical thrust propulsion systems.
Figure 5B:
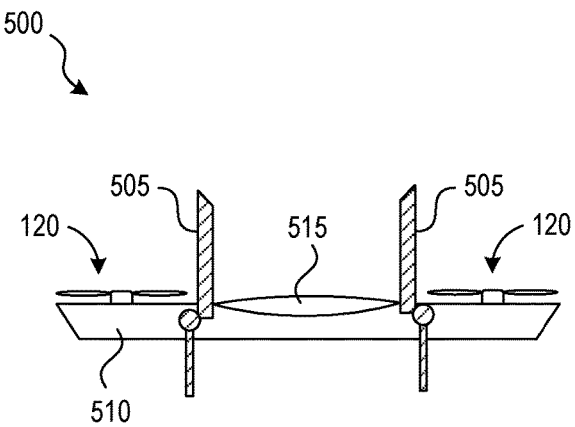
Figure 5C:
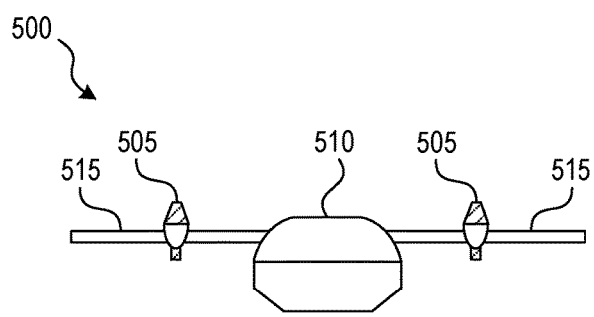
Figure 5D:
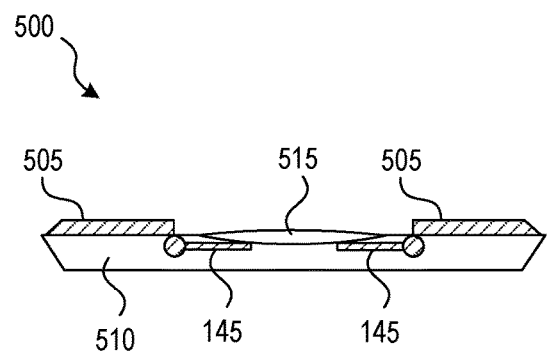

FIGS. 5A, 5B, 5C, and 5D illustrate schematic views of a vehicle 500 with aerodynamic covers 505 to cover the vertical thrust propulsion systems 120. With reference to FIGS. 5A-5D, the vehicle 500 can be generally similar to other vehicles disclosed herein and/or can include features of any other vehicle disclosed herein (e.g., one or more horizontal thrust propulsion systems). For example, the vehicle 500 can include a fuselage 510, one or more wings 515 attached to the fuselage 510, and a number of propulsion systems, such as the vertical thrust propulsion systems 120. The aerodynamic covers 505 rotate relative to the remainder of the vehicle 500 to selectively cover or expose the vertical thrust propulsion systems 120. FIG. 5A illustrates a partially schematic front view of the vehicle 500 in a first configuration in which the aerodynamic covers 505 are open and allow operation of the vertical thrust propulsion systems 120. FIG. 5B illustrates a partially schematic side view of the vehicle 500 in the first configuration. FIG. 5C illustrates a partially schematic front view of the vehicle 500 in a second configuration (a horizontal flight configuration) in which the aerodynamic covers 505 cover the vertical thrust propulsion systems 120. FIG. 5D illustrates a partially schematic side view of the vehicle 500 in the second configuration (the propellers of the thrust propulsion systems 120 are covered).

In some embodiments, the aerodynamic covers 505 can include and/or be connected to corresponding leg elements 145. The leg elements 145 can rotate with the aerodynamic covers 505 so that when the vehicle 500 is in the first configuration, the leg elements 145 can support the vehicle 500 on the ground for vertical takeoff or landing operations and/or for walking operations, which are described in detail below. When the vehicle 500 is in the second configuration, the leg elements 145 can extend along the horizontal flight path and the aerodynamic covers 505 can cover the vertical thrust propulsion systems 120 for efficient aerodynamics. In some embodiments, the aerodynamic covers 505 and the leg elements 145 can further be integrated into an aerodynamic control surface in a manner similar to the aerodynamic control surfaces described above.

Figure 6A:
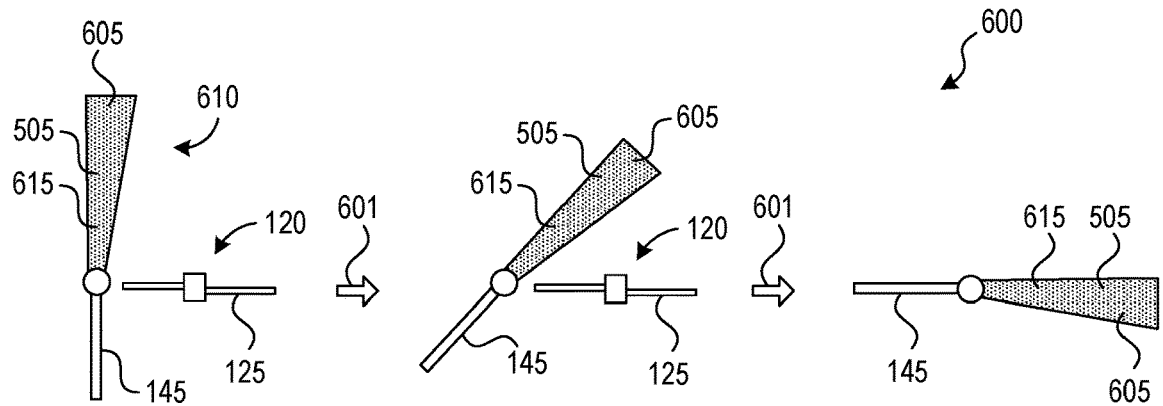
FIGS. 6A, 6B, and 6C each illustrate schematic views of a sequence of covering a vertical thrust propulsion system with an aerodynamic cover, in accordance with embodiments of the present technology.
Figure 6B:
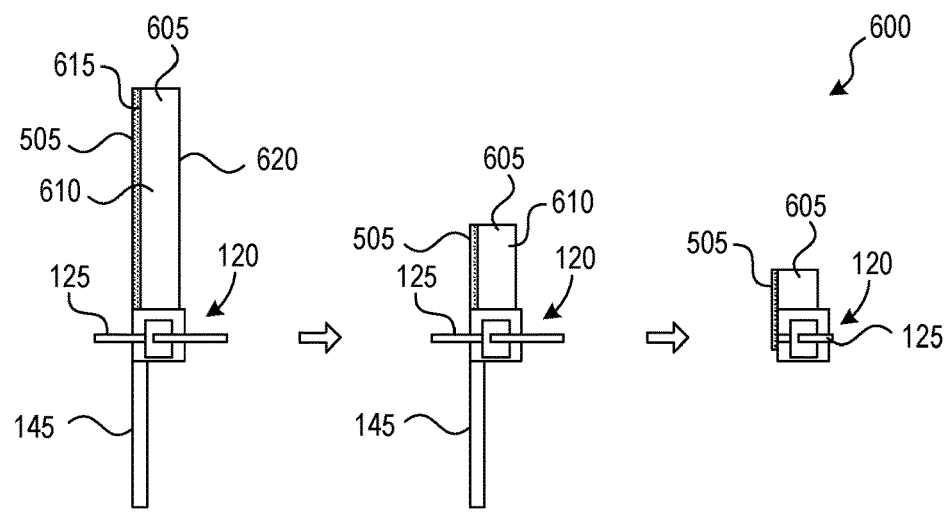
Figure 6C:
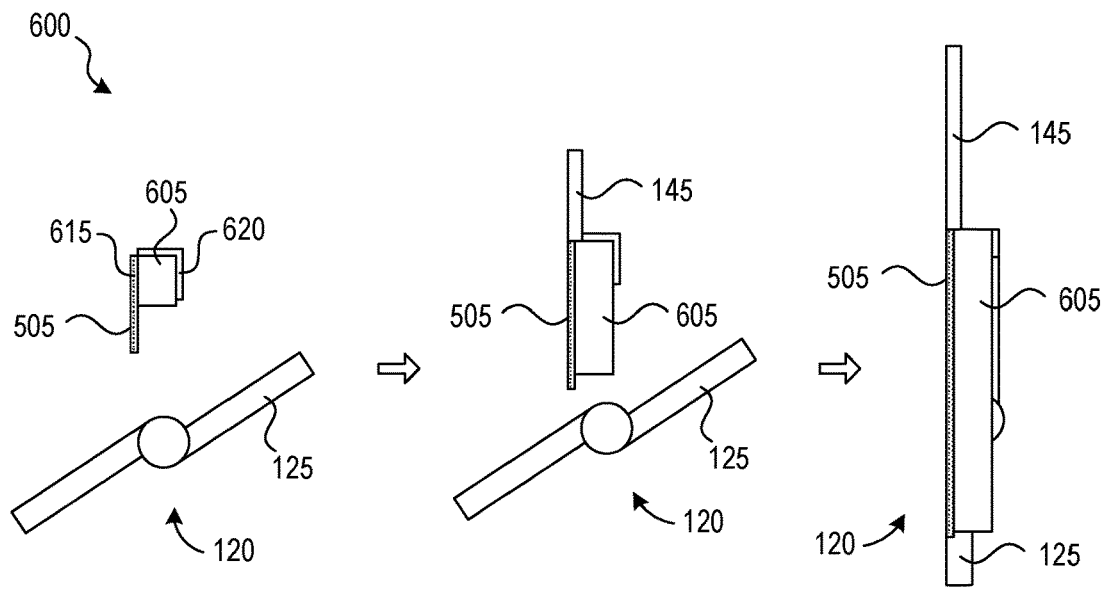

FIGS. 6A, 6B, and 6C each schematically illustrate a sequence 600 of covering a vertical thrust propulsion system 120 (specifically, the propeller 125) with the aerodynamic cover 505, in accordance with embodiments of the present technology. The arrows 601 indicate an order of the sequence 600, although the sequence 600 may be performed in reverse. FIG. 6A is a side view, FIG. 6B is a front view (looking toward the nose portion of an aircraft), and FIG. 6C is a top view.

In some embodiments, the aerodynamic cover 505 includes an elongated aerodynamic box 605 having an opening 610 for receiving the propeller 125. When the aerodynamic cover 505 closes, it needs to align the propeller 125 with the aerodynamic box 605 to receive the propeller 125 in the aerodynamic box 605. To align the propeller 125 with the aerodynamic box 605, the aerodynamic box 605 can include a first side 615 that is longer along a direction that is tangential to the direction of rotation of the aerodynamic cover 505 than a length of an opposing second side 620 (see FIGS. 6B, 6C). When the aerodynamic cover 505 rotates downward toward the propeller 125, the first side 615 may gently contact the propeller 125 before the second side 620, and the first side 615 gently forces the propeller 125 to align with the aerodynamic box 605. FIG. 6C illustrates the propeller 125 going into alignment as it is received in the aerodynamic box 605.

Figure 7:
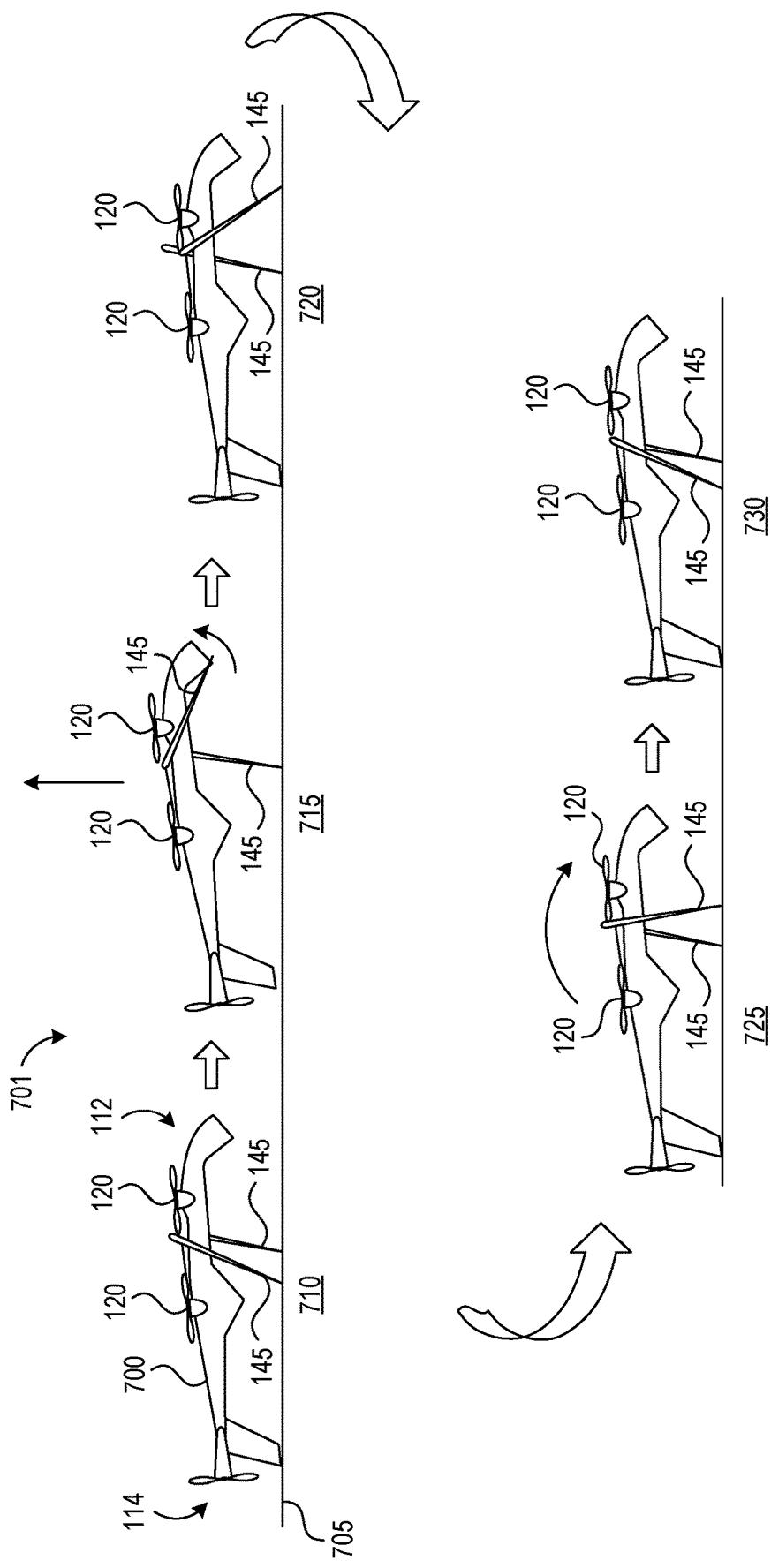
FIG. 7 illustrates a schematic view of a VTOL vehicle in a walking sequence or method.

Vehicles configured in accordance with embodiments of the present technology can "walk" using the leg elements 145. FIG. 7 illustrates a VTOL vehicle 700 in a walking method 701. In general, the vertical thrust propulsion system 120 closest to each leg element 145 operates to lift the leg element 145 off of a surface, such as the ground 705, while the vehicle 700 rotates the leg element 145 forward. In other words, each vertical thrust propulsion system 120 can act like a "knee" to lift the leg element 145 for a walking movement. The leg element 145 then rotates against the ground 705 to pull the vehicle 700 forward. Accordingly, the vehicle 700 can walk by coordinating and/or alternating movements of the leg elements 145.

Specifically, with reference to the sequence/method 701 in FIG. 7, at step 710, the leg elements 145 support the vehicle 700 on the ground 705. At step 715, the vertical thrust propulsion system or systems 120 closest to a first leg element 145 (e.g., the right leg element 145) thrusts a first side (e.g., the right side) of the vehicle 700 upward. The first leg element 145 rotates forward while the other leg element(s) 145 can remain stationary. At step 720, after the first leg element 145 has pivoted forward, the vertical thrust propulsion systems 120 stop providing thrust upwards, and the vehicle 700 settles on the ground 705. At that point, the first leg element 145 is back in contact with the ground 705. At steps 725 and 730, the first leg element 145 rotates rearward to pull the vehicle 700 forward. The sequence is repeated for the second leg element 145 (e.g., the left leg element 145) using the vertical thrust propulsion system or systems 120 closest to the second leg element 145. Repeating the sequence again continues the walking process, as the rotation of each leg element 145 walks the vehicle 700 across the ground 705.

In some embodiments, both leg elements 145 can move simultaneously. For example, forwardmost vertical thrust propulsion system or systems 120 (toward the nose portion 112) can thrust the front of the vehicle 700 upward until the leg elements 145 are off of the ground 705. The leg elements 145 can rotate forward, the vehicle 700 can stop thrusting upwardly, and then the vehicle 700 can settle back on the ground 705. The leg elements 145 can rotate rearward (toward the tail portion 114) to drag the vehicle 700 forward.

Although the sequence shown in FIG. 7 illustrates only two leg elements 145, in some embodiments, two additional leg elements 145 may perform the same or a similar sequence as the two illustrated leg elements 145 (see FIGS. 3A-4B). For example, the leg elements 145 on each side of the vehicle 700 rotate forward when the vertical thrust propulsion system or systems 120 on that side thrust the vehicle upwards, and the leg elements 145 on that side pull the vehicle 700 forward when the vehicle is settled back on the ground 705. Alternatively, the front leg elements 145 may rotate forward together when the front vertical thrust propulsion system or systems 120 lift them from the ground 705, and front leg elements 145 may drag the vehicle 700 forward when the front leg elements 145 are back on the ground 705.

Figure 8A:
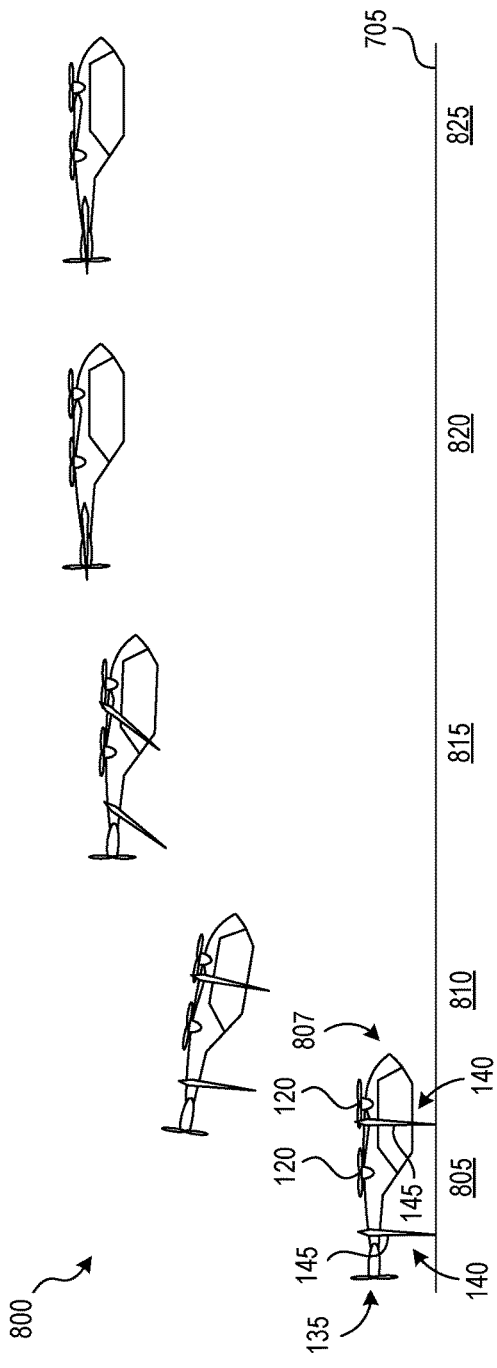
FIG. 8A illustrates a takeoff and flight sequence according to embodiments of the present technology.

FIG. 8A schematically illustrates a takeoff and flight method and sequence 800 configured in accordance with embodiments of the present technology. The sequence 800 can be performed by any of the vehicles disclosed herein and/or configured in accordance with embodiments of the present technology. In a first step 805 of the sequence 800 (the steps are labeled in FIG. 8A beneath the ground 705), a vehicle 807 is on the ground 705. The leg elements 145 of the landing gear assemblies 140 support the vehicle 807 on the ground 705 in the first configuration of the landing gear assemblies 140. Although only two landing gear assemblies 140 and leg elements 145 are shown in FIG. 8A, it is understood that two additional landing gear assemblies 140 are included on the opposite side of the vehicle 807 in symmetric locations. In step 805, the vehicle 807 can "walk" as described above with regard to FIG. 7. One or more vertical thrust propulsion systems 120 of the vehicle 807 begin generating vertical thrust (lift).

In step 810, the vehicle 807 has lifted off and ascends toward an altitude suitable for horizontal flight. In step 815, landing gear assemblies 140 begin rotating toward a second configuration, e.g., a horizontal flight configuration in which the leg elements 145 extend rearwardly in alignment with a horizontal flight path. In step 820, the landing gear assemblies 140 have reached the horizontal flight configuration and the horizontal thrust propulsion system(s) 135 can begin thrusting horizontally. The vertical thrust propulsion systems 120 can shut down. In step 825, the vehicle 807 carries out horizontal flight operations.

Figure 8B:
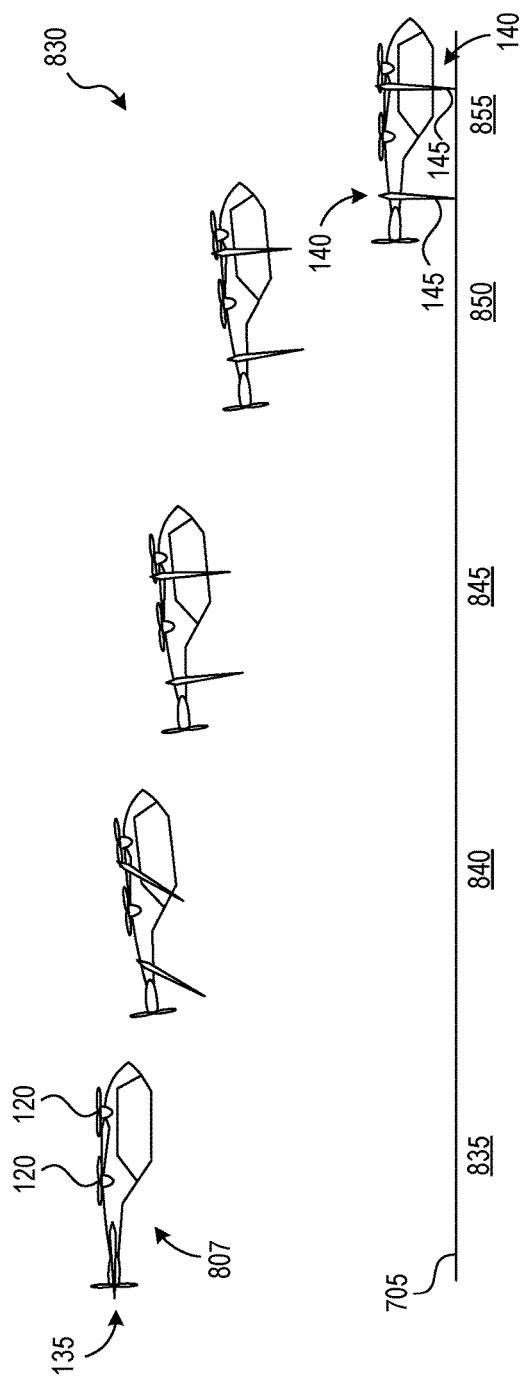
FIG. 8B illustrates a landing sequence according to embodiments of the present technology.

FIG. 8B illustrates a landing sequence 830 in accordance with embodiments of the present technology. In step 835, the vehicle 807 is in horizontal flight and approaching a landing area on the ground 705. The horizontal thrust propulsion system(s) 135 can begin to slow and/or reduce horizontal thrust. In step 840, the landing gear assemblies 140 can begin rotating toward the first configuration (in which the leg elements 145 point downwardly for contact with the ground 705). In step 845, the horizontal thrust propulsion system(s) 135 can shut down and the vertical thrust propulsion systems 120 can provide generally vertical thrust. When in the first configuration, the landing gear assemblies 140 can assist with air braking to reduce the forward horizontal speed of the vehicle 807. In step 850, the vehicle 807 lowers toward the ground 705. In step 855, the vehicle 807 has landed and the vertical thrust propulsion systems 120 can turn off. In step 855 or later, the vehicle 807 can "walk" as described above with regard to FIG. 7.

Figure 9:
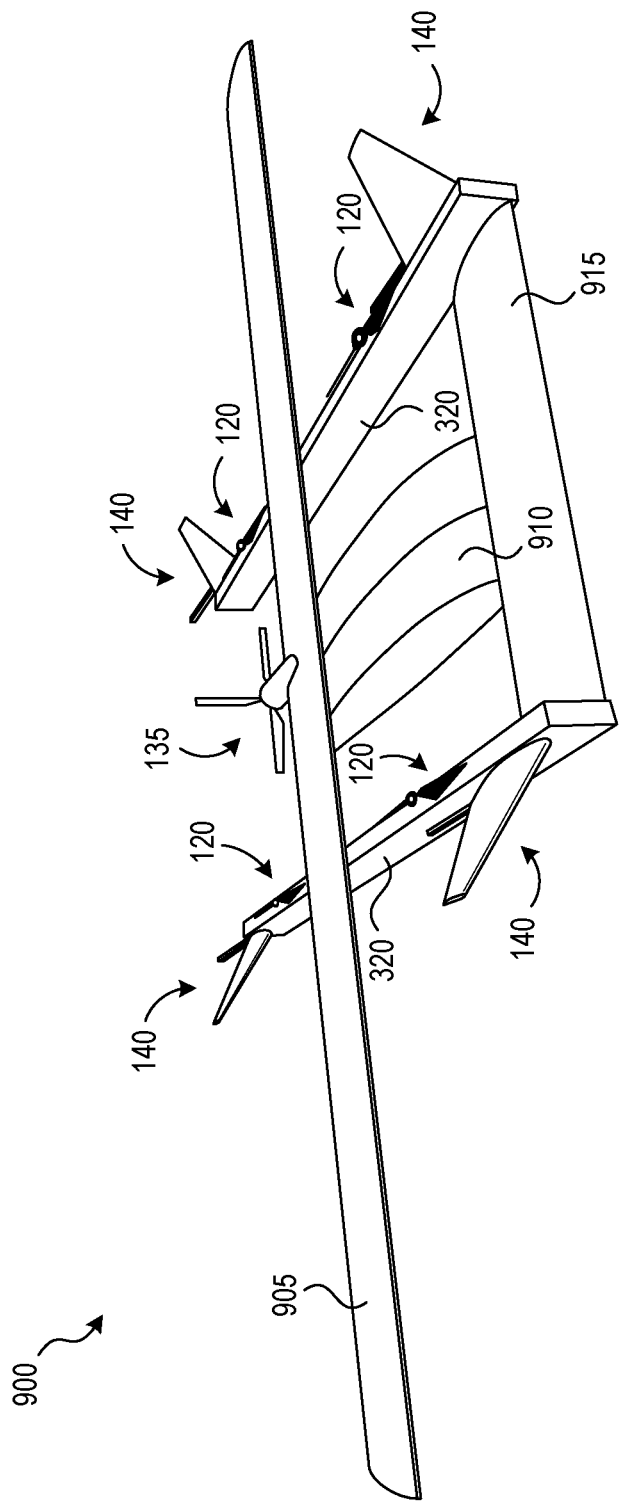
FIG. 9 illustrates a partially schematic perspective view of a vehicle (aircraft) configured in accordance with embodiments of the present technology.

FIG. 9 illustrates a partially schematic perspective view of a vehicle 900 configured in accordance with embodiments of the present technology. The vehicle 900 can include several features described above with regard to FIGS. 1-8B. In some embodiments, the vehicle 900 can include a main wing 905, a fuselage 910 carried beneath the main wing 905, and a forewing 915 supported by two outriggers 320. The main wing 905 can be larger than the forewing 915. In some embodiments, the forewing 915 can be positioned lower than the main wing 905. The fuselage 910 can include an aerodynamic shape (e.g., an airfoil shape) and an area to receive cargo. Aspects of the present technology associated with carrying cargo are described in additional detail below. In some embodiments, the vehicle 900 provides a balanced center of gravity and a symmetric structure that facilitates stability when the vehicle 900 is on the ground.

Cargo Transportation Using Walking VTOL Drones and Other Drones

Vehicles configured in accordance with embodiments of the present technology (including any of the vehicles disclosed herein) facilitate improvements in cargo transportation described below with regard to FIGS. 10A-13B. Any of the vehicles disclosed herein can hover and move side to side using the propulsion systems (e.g., the vertical thrust propulsion systems 120) to pick up and/or deliver cargo. Walking enables movement and repositioning on uneven ground and to position aircraft over cargo to be loaded.

Figure 10A:
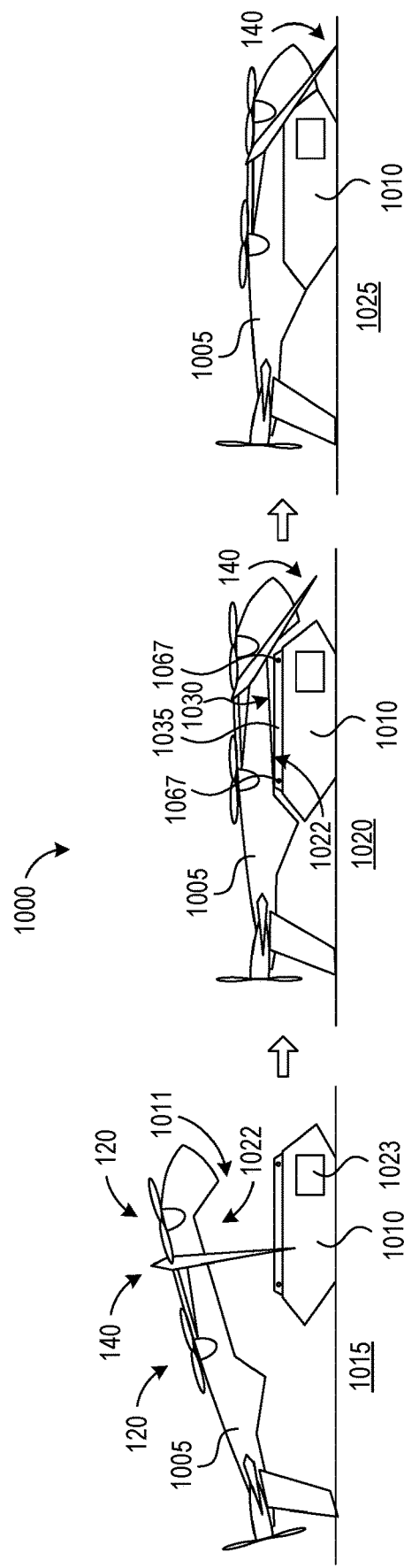
FIG. 10A illustrates a partially schematic side view of a sequence of a vehicle (aircraft) moving to, aligning with, and collecting cargo in accordance with embodiments of the present technology.

FIG. 10A illustrates a partially schematic side view of a sequence 1000 of a vehicle 1005 retrieving a parcel of cargo 1010 (e.g., moving to, aligning with, and collecting the parcel of cargo 1010) in accordance with embodiments of the present technology. After landing, or otherwise prior to takeoff (see FIGS. 8A, 8B), the vehicle 1005 can walk towards the cargo 1010 (see FIG. 7). In some embodiments, the vehicle 1005 can include cameras and/or other sensors to locate the cargo 1010 and/or to avoid obstacles as it moves toward the cargo 1010. At step 1015, the vehicle 1005 can use one or more of its vertical thrust propulsion systems 120 to lift itself over the cargo 1010 and place itself over the cargo 1010. At step 1020, the vehicle 1005 aligns a cargo bay 1022 to receive the cargo 1010 and lowers onto the cargo 1010. The cargo bay 1022 is positioned in a lower portion 1011 of a fuselage (e.g., a belly region) of the vehicle 1005 and is accessible from beneath the fuselage. At step 1025, the cargo is connected to the vehicle 1005 within the cargo bay 1022 via any suitable connection mechanism 1030. When the vehicle 1005 has the cargo 1010, the vehicle 1005 is ready to walk or fly to move the cargo 1010 to another location (see FIG. 8A for a suitable takeoff sequence). In some embodiments, a shape of the cargo 1010 can correspond to a shape of the cargo bay 1022 to facilitate alignment between the vehicle 1005 and the cargo 1010. In some embodiments, the cargo 1010 can include packages for delivery or other typical cargo items, and/or a surveillance system 1023 (such as a camera and/or other sensors suitable for surveillance activities).

Figure 10B:
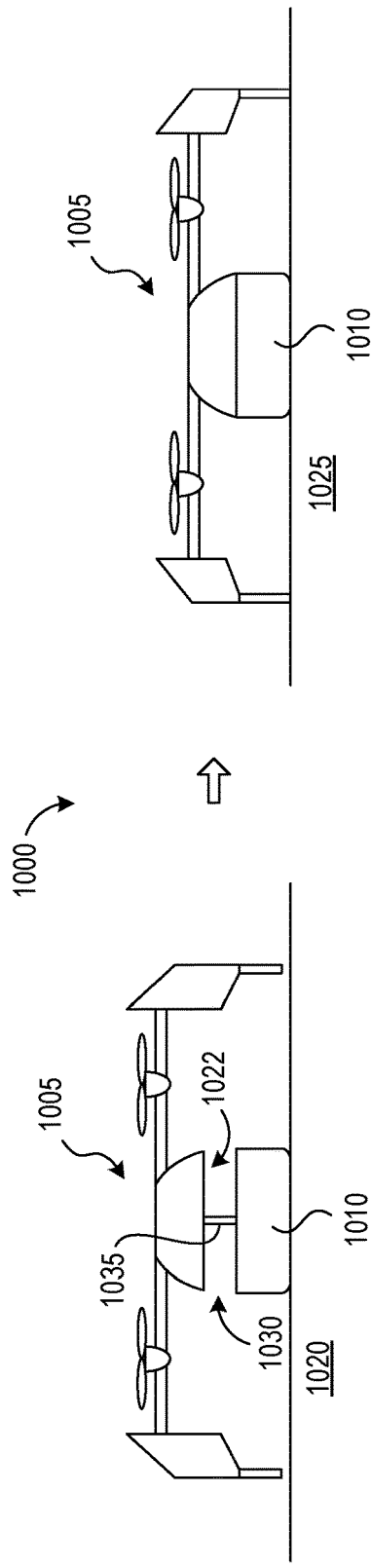
FIG. 10B illustrates a partially schematic front view of portions of the sequence shown in FIG. 10A.

FIG. 10B illustrates a front view of portions of the sequence 1000 shown in FIG. 10A. In some embodiments, a suitable connection mechanism 1030 can include a rib 1035 or another suitable structural projection extending from the cargo 1010 that engages a corresponding slot in the cargo bay 1022.

Figure 10C:
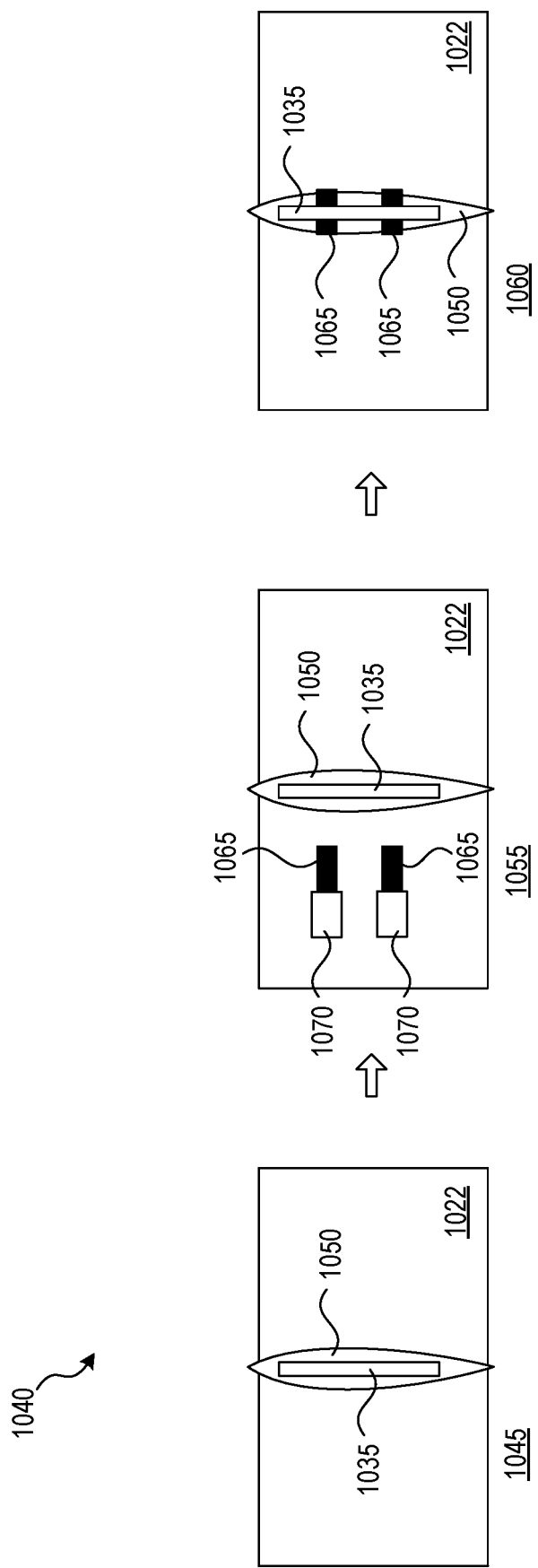
FIG. 10C illustrates a partially schematic top view of a sequence of engaging a connection mechanism shown in FIGS. 10A and 10B.

FIG. 10C illustrates a partially schematic top view of a sequence 1040 of engaging the connection mechanism 1030 shown in FIG. 10B. At step 1045, the rib 1035 enters a slot 1050 in the cargo bay 1022. With reference to steps 1055 and 1060, the connection mechanism 1030 can include one or more retention elements, such as retention pins 1065 that engage corresponding holes 1067 in the rib 1035 (see FIG. 10A). The vehicle 1005 can include one or more actuators 1070 for moving the retention pins 1065 in and out of the holes 1067 for engaging and releasing the cargo 1010. Some embodiments include two or more retention pins 1065 for stabilizing the cargo 1010 against rocking, and for redundancy.

In some embodiments, the vehicle 1005 and the cargo 1010 are aerodynamically shaped (e.g., optimized) to reduce drag when the cargo 1010 is connected to the vehicle 1005. In some embodiments, the vehicle 1005 helps protect the cargo 1010 from outside weather, for example, by receiving the cargo 1010 in the correspondingly-shaped cargo bay 1022.

Figure 11A:
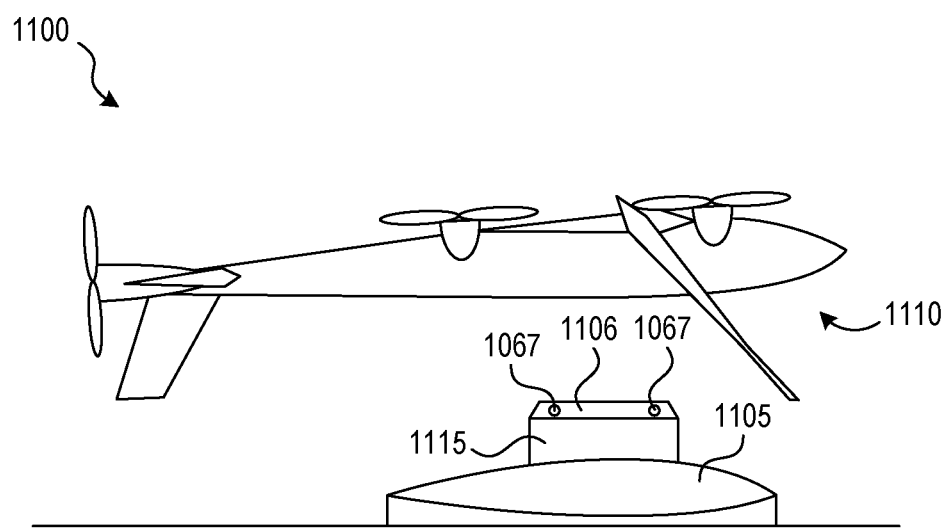
FIGS. 11A and 11B illustrate partially schematic side views of a vehicle collecting cargo in accordance with embodiments of the present technology.
Figure 11B:
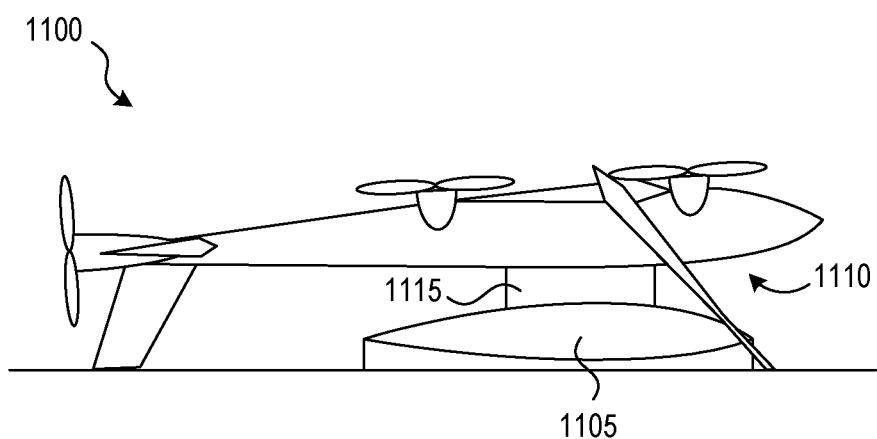

However, in other embodiments, vehicles need not have correspondingly-shaped cargo bays for receiving cargo. For example, FIGS. 11A and 11B illustrate partially schematic side views of a vehicle 1100 collecting cargo 1105 in accordance with further embodiments of the present technology. The vehicle 1100 can be similar to other vehicles disclosed herein (e.g., it can include features of any of the vehicles disclosed herein), however, in some embodiments, instead of a cargo bay, it can include a slot on a lower portion 1110 (belly region) of the vehicle 1100. The slot can resemble the slot 1050 shown in FIG. 10C. The cargo 1105 can include a strut 1115 with a rib 1106 that can engage the slot in a manner similar to the connection mechanism 1030 described above with regard to FIGS. 10B and 10C (e.g., with retention pins and corresponding holes 1067).

Figure 12A:
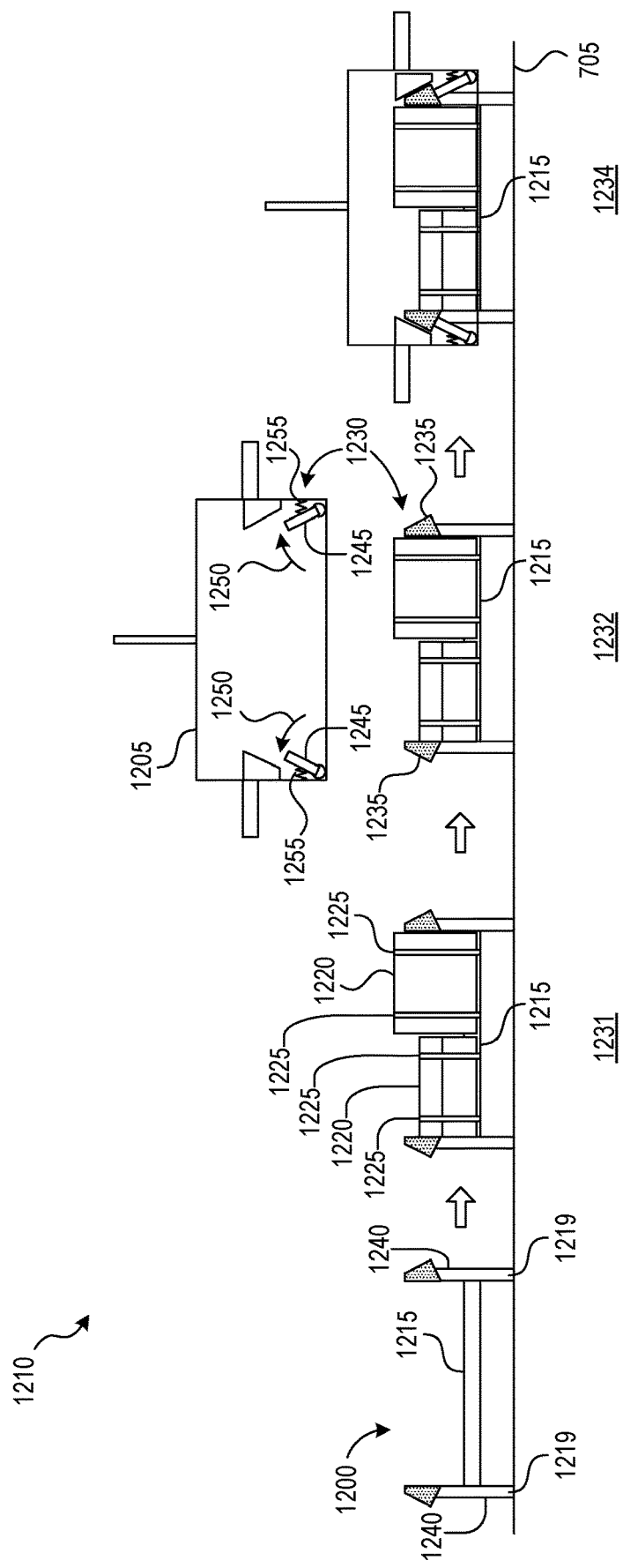
FIG. 12A illustrates a schematic front view of a cargo platform system and a vehicle (aircraft) in a sequence of loading and picking up cargo, in accordance with embodiments of the present technology.

FIG. 12A illustrates a schematic view of a cargo platform system 1200 and a vehicle 1205 in a sequence 1210 of loading and picking up cargo, in accordance with embodiments of the present technology. The vehicle 1205 can include any vehicle configured in accordance with embodiments of the present technology and disclosed herein, and/or other vehicles. In some embodiments, the platform system 1200 includes a platform 1215 with three or more feet 1219 for supporting the platform 1215 on the ground 705 (as illustrated, two front feet obscure visibility of two rear feet). The platform 1215 can carry one or more packages 1220 of cargo. One or more straps 1225 can restrain the packages 1220 to the platform 1215. The platform system 1200 and the vehicle 1205 can include an attachment system 1230 for the vehicle 1205 to engage the platform system 1200 to lift the platform system 1200 from the ground 705 and carry it to a new destination, where the vehicle 1205 can release the platform system 1200 for unloading and/or more loading of packages 1220. Accordingly, in step 1231, the platform system 1200 can be loaded with cargo 1220, and in steps 1232 and 1234, the vehicle 1205 can lower onto the platform system 1200 to engage the attachment system 1230 before flying to a new destination.

Figure 12B:
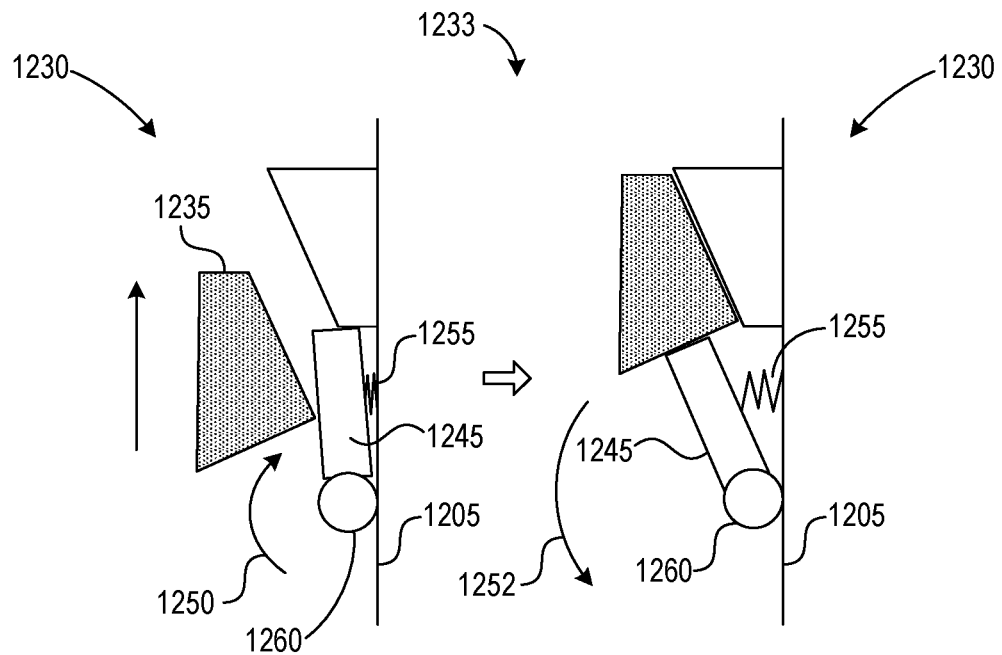
FIG. 12B illustrates a schematic view of a latching sequence for the attachment system shown in FIG. 12A.

FIG. 12B illustrates a detailed schematic view of the attachment system 1230 shown in FIG. 12A in a latching sequence 1233. With reference to FIGS. 12A and 12B, the attachment system 1230 can include a plurality of locking locations or catches 1235 extending away from rails 1240 of the platform system 1200. The bottoms of the rails 1240 include the feet 1219. The attachment system 1230 can further include components that are carried on and/or inside the vehicle 1205. For example, the attachment system 1230 can include one or more rotatable detent elements 1245 (for example, a number of detent elements 1245 corresponding to the number of catches 1235) that can rotate along a rotation pathway 1250. When the platform system 1200 at least partially enters the vehicle 1205, the catches 1235 contact the detent elements 1245, causing them to temporarily rotate away from the catches 1235 (along the rotation pathway 1250) until the catches 1235 pass the detent elements 1245. Then the detent elements 1245 rotate opposite the pathways 1250 (along a rotation pathway 1252) to block the catches 1235 from reversing out of the vehicle 1205.

In some embodiments, the detent elements 1245 can be biased with one or more biasing elements 1255, such as springs, that bias the detent elements 1245 opposite the rotation pathways 1250, so that the platform system 1200 clicks or latches into the vehicle 1205. When the platform system 1200 is secured in the vehicle 1205, the vehicle 1205 can carry out operations disclosed herein, including takeoff, landing, walking, or other activities. To release the platform system 1200, the attachment system 1230 can include motors 1260 for rotating the detent elements 1245 along the pathway 1250 away from the catches 1235, which allows the platform system 1200 to come out of the vehicle 1205. The vehicle 1205 can leave the platform system 1200 at a location and fly or walk away from the platform system 1200.

Figure 12C:
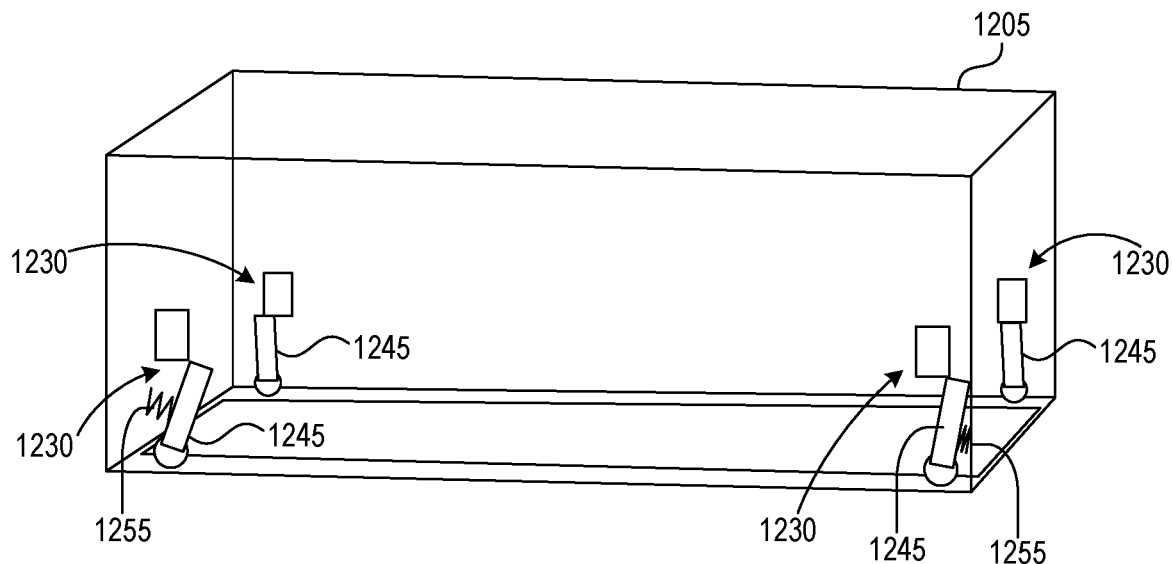
FIG. 12C is a schematic perspective view of a portion of the vehicle shown in FIG. 12A.

FIG. 12C is a schematic perspective view of a portion of the vehicle 1205 and the attachment system(s) 1230. In some embodiments, the vehicle 1205 can include four detent elements 1245 and four corresponding biasing elements 1255, such as one arrangement at each corner of the vehicle 1205.

Figure 13A:
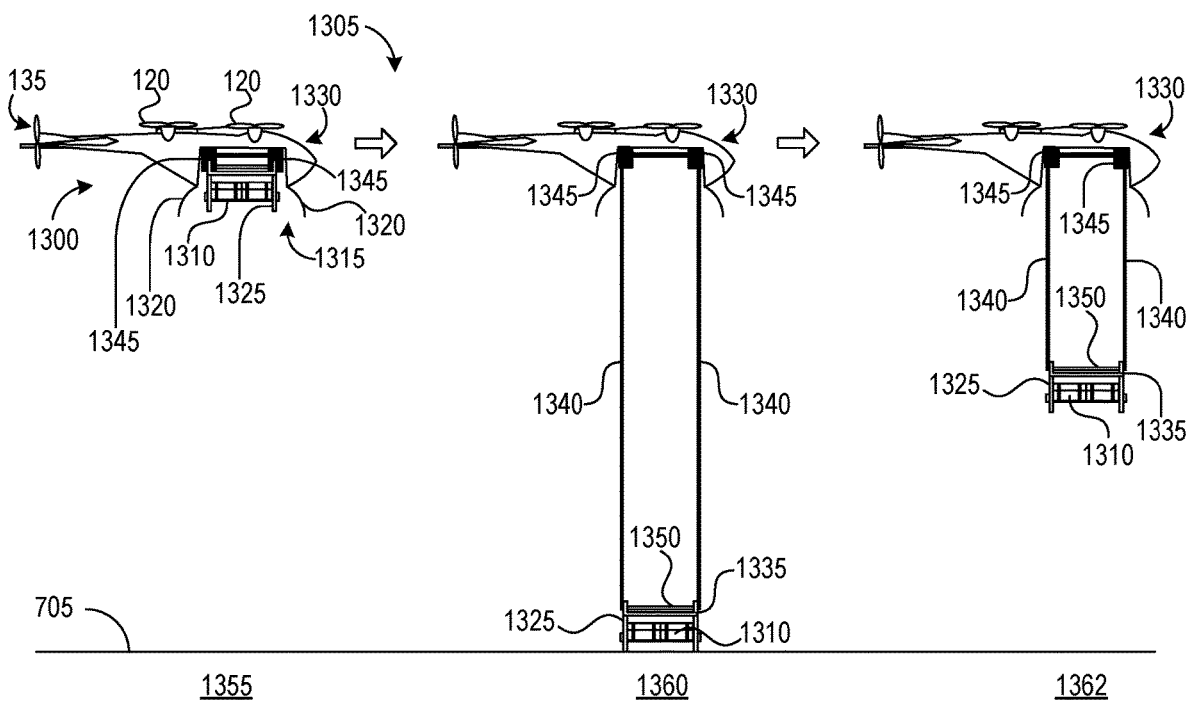
FIG. 13A illustrates a side schematic view of a vehicle (aircraft) in a sequence of delivering and/or receiving cargo, in accordance with embodiments of the present technology.

FIG. 13A illustrates a side schematic view of a vehicle 1300 in a sequence 1305 of delivering and/or receiving cargo 1310, in accordance with embodiments of the present technology. The vehicle 1300 can include any of the features of vehicles disclosed herein. In some embodiments, the vehicle 1300 can include a cargo bay 1315 and one or more cargo bay doors 1320 for selectively opening to provide access to the cargo bay 1315 and closing to protect the cargo 1310 when the cargo 1310 is in the cargo bay 1315, and to improve aerodynamics during horizontal flight. In some embodiments, a platform 1325 carries the cargo 1310. The vehicle 1300 can include a winch system 1330 for raising and/or lowering the platform 1325.

Figure 13B:
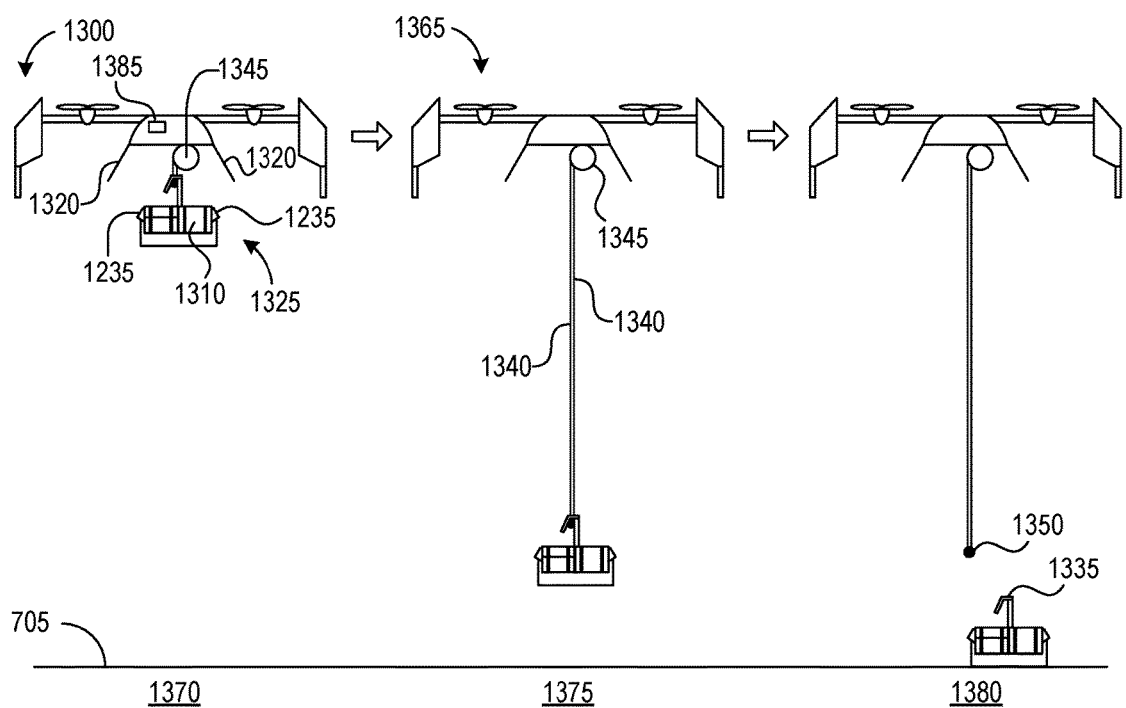
FIG. 13B illustrates a front schematic view of the vehicle shown in FIG. 13A in a sequence of delivering cargo, in accordance with embodiments of the present technology.

In some embodiments, the platform 1325 includes one or more hooks 1335 (which are also shown in FIG. 13B). For example, the platform 1325 can include two hooks 1335 (one on either side of the platform 1325), and/or the platform 1325 can include a single elongated hook 1335 that spans at least part of a length of the platform 1325. The winch system 1330 can include one or more (such as two) cables 1340. Each cable 1340 can be connected at a first end to one or more mechanical and/or motorized winches 1345 in the cargo bay 1315. Each cable 1340 can be connected at a far end to a crossbeam 1350. The crossbeam 1350 can span between the cables 1340.

In operation, in some embodiments, a cargo drop-off sequence can include a step 1355 of arriving at a location and opening the cargo bay doors 1320, followed by a step 1360 of lowering the platform 1325 by extending the cables 1340 with the winch(es) 1345 until the platform 1325 is on the ground 705. At that point, the cargo 1310 can be removed and/or replaced from the platform 1325 by a human, a robot, and/or another suitable system. At step 1362, the winch(es) 1345 can retract the cables 1340 and bring the platform 1325 back into the cargo bay 1315. The cargo bay doors 1320 can close and the vehicle 1300 can proceed to another destination and/or mission. In some embodiments, using two cables 1340 helps to resist spinning or destabilization of the platform 1325 as the winch system 1330 raises and/or lowers the platform. A feature of the system and method described above with regard to FIG. 13A is that the vehicle 1305 does not have to perform cargo loading or unloading itself, which can save power and time. While cargo is loaded on and/or unloaded from the platform 1325, the vehicle 1305 can hover in place.

FIG. 13B illustrates a front schematic view of the vehicle 1300 in a sequence 1365 of delivering cargo 1310, in accordance with embodiments of the present technology. At step 1370, the vehicle 1300 can hover over a drop-off area. The vehicle 1300 can open the cargo bay doors 1320, release the attachment system 1230 (see above), and begin lowering the platform 1325 with the one or more winches 1345. In step 1375, the vehicle 1300 continues lowering the platform 1325. In step 1380, after the platform 1325 is supported on the ground 705, the crossbeam 1350 can disengage from the one or more hooks 1335. To disengage the crossbeam 1350 from the one or more hooks 1335, the vehicle 1300 and/or the one or more winch(es) 1345 can cause the crossbeam 1350 to lower down, and the vehicle 1300 can move the crossbeam 1350 away from beneath the hooks 1335. Then the vehicle 1300 can retract the crossbeam 1350 and/or pick up another platform 1325 by engaging the crossbeam 1350 with the one or more hooks 1335. To engage the crossbeam 1350 with the one or more hooks 1335, the process can be reversed.

Advantages of the vehicle 1300 and the sequences 1305, 1365 for picking up and/or dropping off cargo 1310 include stability due to the use of two cables 1340, which resist spinning the platform 1325. In addition, the aircraft only has to load the platform 1325 so it does not use energy loading or unloading individual pieces of cargo, which saves power and time. The cargo bay doors 1320 and the storage of the platform 1325 within the vehicle 1300 help keep the cargo 1310 out of the weather and improve aerodynamics. When the platform 1325 is within the vehicle 1300, the attachment system 1230 described above can hold it securely. In some embodiments, the vehicle 1300 can include one or more sensors 1385 for automatically locating, attaching, loading, and unloading the platform 1325.

Solar Charging

Vehicles configured in accordance with embodiments of the present technology (such as the vehicles described above with regard to FIGS. 1-13B), can receive solar energy for power and recharging during flight and/or while on the ground.

Figure 14:
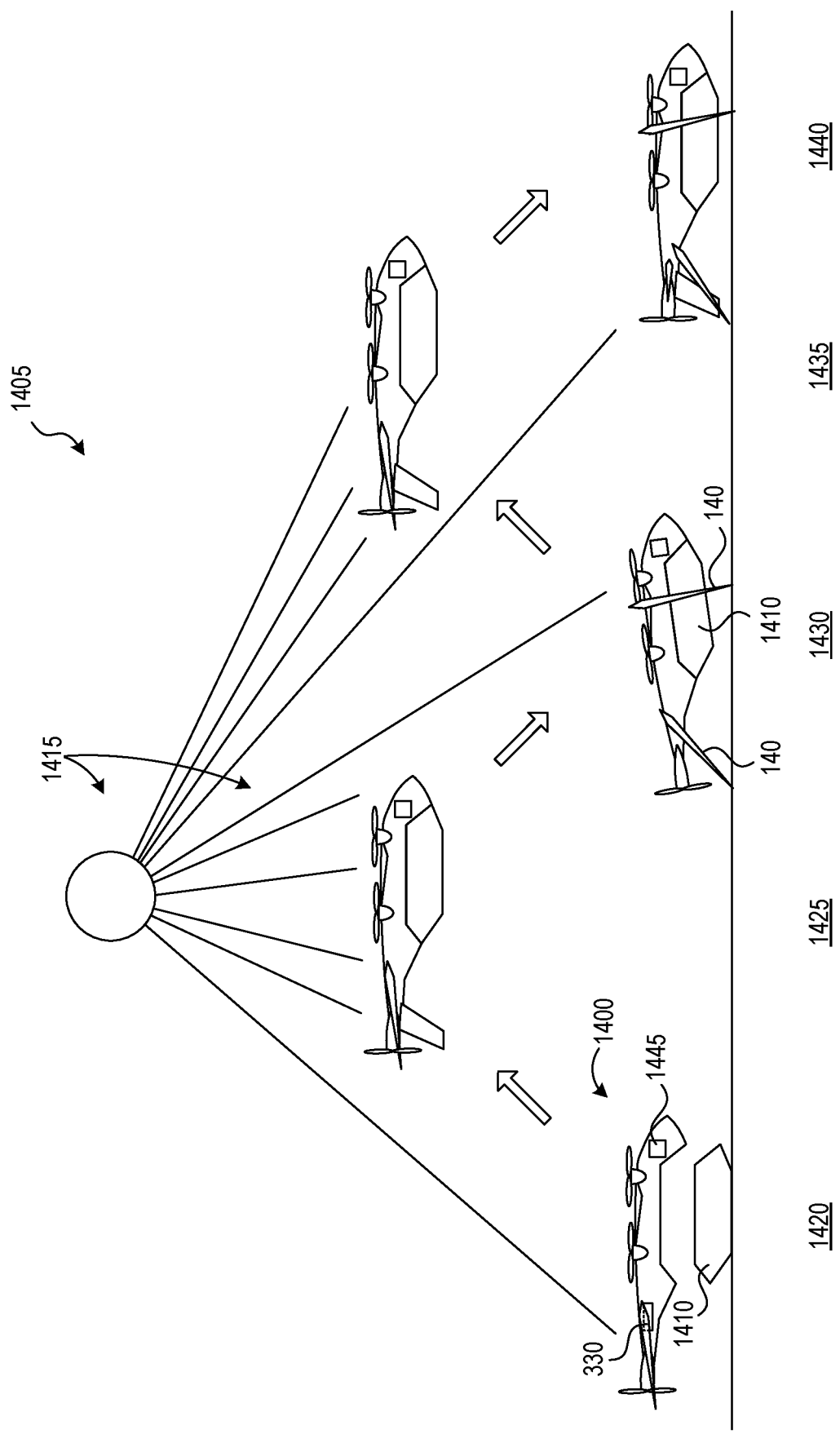
FIG. 14 illustrates a side schematic view of a vehicle (aircraft) configured in accordance with embodiments of the present technology in a process for dropping off and/or receiving cargo, flying, and/or walking (ambulating).

FIG. 14 illustrates a side schematic view of a vehicle 1400 configured in accordance with embodiments of the present technology in a process 1405 for dropping off and/or receiving cargo 1410, flying, and/or walking. The vehicle 1400 can be similar to, and/or include features of, other vehicles disclosed herein. For example, the vehicle 1400 can include one or more solar panels 330 (see also FIGS. 3A and 3B) for receiving sunlight 1415 and converting the sunlight 1415 to energy for powering propulsion systems, charging batteries 155 (see FIG. 1A), or for other suitable aspects of vehicle 1400 operation.

While the vehicle 1400 is on the ground, the vehicle 1400 can walk or otherwise position itself to remain at a suitable location and/or angle for receiving the sunlight 1415. Likewise, when the vehicle is aligning with cargo 1410 (either while flying or walking), it can align itself to remain in position to receive sunlight 1415. Accordingly, systems and vehicle 1400 configured in accordance with embodiments of the present technology can carry out long distance delivery and/or pickup operations via solar power.

In some embodiments, the process 1405 can include a step 1420 of the vehicle 1400 aligning itself with the cargo 1410, a step 1425 of flight (which can include vertical takeoff and reconfiguration of the landing gear assemblies 140 as described above), a step 1430 of landing and walking at an intermediate stop location (as described above), another step 1435 of flight, and another step 1440 of walking. Accordingly, the vehicle 1400 can jump and/or make long distance flights from place to place for pickup and/or drop-off of cargo 1410. In some embodiments, the vehicle 1400 can fly to a first location to drop off cargo 1410, where a second vehicle can receive the cargo 1410 and take it to another location. Embodiments of the present technology, therefore, include methods of moving cargo 1410 by flying and/or walking the cargo 1410 from a first location ("node") to a second location using one or more coordinating vehicles 1400.

In some embodiments, the vehicle 1400 can include one or more sensors 1445, such as a global positioning system, a camera, a compass, and/or a solar detector, for the vehicle to align itself with the sunlight 1415. Alignment with the sunlight 1415 can increase charging rates by 30%, for example.

In some embodiments, the one or more controllers 165 (see FIG. 1A) are programmed with instructions that, when executed, carry out some or all of the sequences, methods, and/or other operations disclosed herein. In some embodiments, a human operator can carry out and/or assist with any of the sequences, methods, and/or other operations, for example, with remote control systems known in the art.

One feature of several of the embodiments described above, and with other embodiments configured according to the present disclosure, is that the technology enables long distance missions. For example, a vehicle can fly while charging using solar energy. If the vehicle needs to recharge for a longer period while not flying, the vehicle can land and walk itself to orient itself toward the sun. Accordingly, the vehicle can take "breaks" at any suitable location, and dedicated charging stations are not required. Vehicles according to embodiments of the present technology can also land to avoid danger, pick up and drop off packages at any suitable location, walk to maneuver on uneven terrain, and/or other activities.

From the foregoing, it will be appreciated that specific embodiments of the disclosed technology have been described herein for purposes of illustration, but that various modifications may be made without deviating from the technology. For example, any suitable type and/or number of propulsion systems can be implemented, and/or various embodiments can include other configurations of fuselages, wings, and/or propulsion systems than those disclosed herein. Although the leg elements are disclosed as being part of a landing gear assembly that also includes an aerodynamic control surface, in some embodiments, the landing gear assemblies need not include an aerodynamic control surface. For example, the leg elements can be directly attached to other parts of the aircraft, separate from aerodynamic control surfaces, and movable with their own suitable actuators. Although specific quantities, dimensions, or other numerical characterizations are provided for context and/or to indicate representative embodiments, various further embodiments can have other quantities, sizes, or characteristics (for example, sizes, quantities, and/or characteristics commensurate with strength requirements or other variables).

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated. To the extent any materials incorporated herein by reference conflict with the present disclosure, the present disclosure controls.

Many embodiments of the technology described herein may take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller, or data processor that is specifically programmed, configured, or constructed to perform one or more of the computer-executable instructions described herein. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers, and the like). Information handled by these computers can be presented at any suitable display medium, including an LCD.

The technology can also be practiced in distributed environments, where tasks or modules are performed by remote processing devices that are linked through a communications network (e.g., a wireless communication network, a wired communication network, a cellular communication network, the Internet, and/or a short-range radio network such as Bluetooth). In a distributed computing environment, program modules and/or subroutines may be located in local and remote memory storage devices. Aspects of the technology described herein may be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

I claim:

1. A vertical take-off and landing vehicle comprising:
 a fuselage extending along a longitudinal axis;
 one or more wings connected to the fuselage;
 a propeller positioned to provide thrust for the vehicle along a vertical direction transverse to the longitudinal axis; and
 a landing gear assembly;
 wherein:
  the landing gear assembly comprises a leg element and an aerodynamic control surface;
  the aerodynamic control surface carries the leg element; and
  the landing gear assembly is rotatable between a first configuration in which the leg element extends downwardly and a second configuration different from the first configuration.

2. The vertical take-off and landing vehicle of claim 1, wherein when the landing gear assembly is in the first configuration, the leg element is positioned to support the vehicle on a surface, and when the landing gear assembly is in the second configuration, the leg element extends along and beside the fuselage.

3. The vertical take-off and landing vehicle of claim 1, further comprising one or more additional landing gear assemblies, wherein each landing gear assembly is rotatable between the first configuration and the second configuration, and wherein when each landing gear assembly is in the first configuration, each landing gear assembly is movable to walk the vehicle along a surface.

4. The vertical take-off and landing vehicle of claim 1, wherein the landing gear assembly is carried by the one or more wings.

5. The vertical take-off and landing vehicle of claim 1, further comprising a second propeller positioned to provide thrust along a horizontal direction.

6. The vertical take-off and landing vehicle of claim 1, further comprising one or more solar panels positioned to collect solar energy to power the vehicle.

7. The vertical take-off and landing vehicle of claim 1, wherein the landing gear assembly further comprises a cover positioned to cover the propeller when the landing gear assembly is in the second configuration.

8. The vertical take-off and landing vehicle of claim 1, wherein the vehicle further comprises an outrigger assembly, and wherein the aerodynamic control surface is attached to the outrigger assembly.

9. The vertical take-off and landing vehicle of claim 1, further comprising a cargo bay and one or more winches positioned in the cargo bay, wherein each winch is positioned to extend and retract a cable.

10. The vertical take-off and landing vehicle of claim 1, comprising two winches, two cables, and a crossbeam spanning between the cables.

11. The vertical take-off and landing vehicle of claim 1, further comprising a cargo bay and a plurality of detent elements positioned in the cargo bay, wherein the detent elements are positioned to selectively secure and release a parcel of cargo in the cargo bay.

12. The vertical take-off and landing vehicle of claim 1, further comprising a cargo bay positioned in a belly region of the vehicle, and one or more cargo bay doors positioned to open and close to cover the cargo bay.

13. A vertical take-off and landing vehicle comprising:
a fuselage;
one or more wings connected to the fuselage;
one or more vertical thrust propulsion systems carried by the vehicle and positioned to provide vertical thrust for the vehicle;
one or more horizontal thrust propulsion systems carried by the vehicle and positioned to provide horizontal thrust for the vehicle;
a plurality of leg elements rotatable between a first configuration in which each leg element extends downwardly and a second configuration different from the first configuration; and
a controller programmed with instructions that, when executed:
operate the one or more vertical thrust propulsion systems to lift a first leg element of the plurality of leg elements off of a surface; then
cause the first leg element to rotate along a first direction; then
operate the one or more vertical thrust propulsion systems to lower the first leg element back on to the surface; and then
cause the first leg element to rotate along a second direction that is opposite the first direction, to propel the vehicle along the surface.

14. The vertical take-off and landing vehicle of claim 13, comprising a cargo bay positioned in a belly region of the fuselage and accessible from below the vehicle.

15. The vertical take-off and landing vehicle of claim 14, further comprising a slot positioned in the cargo bay, wherein the slot is positioned to receive a corresponding rib on a parcel of cargo.

16. The vertical take-off and landing vehicle of claim 15, further comprising one or more retention elements positioned to engage the rib.

17. The vertical take-off and landing vehicle of claim 13, further comprising a slot positioned in a lower portion of the vehicle and positioned to receive a corresponding rib on a parcel of cargo.

18. The vertical take-off and landing vehicle of claim 13, further comprising one or more aerodynamic control surfaces, wherein each leg element is attached to an aerodynamic control surface and positioned to rotate therewith.

19. The vertical take-off and landing vehicle of claim 13, further comprising one or more solar panels positioned to receive solar energy for providing power to the vehicle.

20. The vertical take-off and landing vehicle of claim 19, wherein the controller is programmed with instructions that, when executed:
move the vehicle along the surface to orient the solar panels toward a light source.

21. The vertical take-off and landing vehicle of claim 13, wherein the controller is further programmed with instructions that, when executed:
move the vehicle along the surface toward a parcel of cargo;
cause the vehicle to engage the parcel of cargo; and
cause the vertical thrust propulsion systems to lift the vehicle and the parcel of cargo off of the surface.

22. A method of operating a vertical take-off and landing vehicle, the method comprising:
operating one or more vertical thrust propulsion systems carried by the vehicle to raise at least a first portion of the vehicle upward;
rotating a first leg element carried by the vehicle, wherein rotating the first leg element comprises rotating the first leg element along a first direction;
operating the one or more vertical thrust propulsion systems to lower the first portion of the vehicle to allow the first leg element to contact a surface;
rotating the first leg element along a second direction opposite the first direction to propel the vehicle along the surface via contact between the first leg element and the surface;
operating the one or more vertical thrust propulsion systems to raise at least a second portion of the vehicle upward;
rotating a second leg element carried by the vehicle, wherein rotating the second leg element comprises rotating the second leg element along the first direction;
operating the one or more vertical thrust propulsion systems to lower the second portion of the vehicle to allow the second leg element to contact the surface; and
rotating the second leg element along the second direction to propel the vehicle along the surface via contact between the second leg element and the surface.

23. The method of claim 22, wherein rotating the first leg element along the first direction is performed simultaneously with rotating the second leg element along the first direction.

24. The method of claim 22, further comprising rotating a third leg element and a fourth leg element.

25. The method of claim 22, further comprising moving the vehicle along the surface to orient one or more solar panels toward a light source.

26. The method of claim 22, further comprising retrieving or delivering a parcel of cargo while the vehicle is on the surface.

27. The method of claim 22, further comprising:
operating the one or more vertical thrust propulsion systems to lift the vehicle to become airborne; and
operating one or more horizontal thrust propulsion systems to propel the vehicle forward while airborne.

28. The method of claim 27, further comprising rotating the first and second leg element to align the first and second leg elements with a horizontal direction.

29. The method of claim 22, wherein operating the one or more vertical thrust propulsion systems carried by the vehicle to raise at least a first portion of the vehicle upward is performed prior to operating the one or more vertical thrust propulsion systems to raise at least a second portion of the vehicle upward.

* * * * *